United States Patent
Hu et al.

(10) Patent No.: US 11,855,274 B2
(45) Date of Patent: Dec. 26, 2023

(54) HARD CARBON BEADS, THEIR PREPARATION, AND ENERGY STORAGE DEVICE COMPRISING THE SAME

(71) Applicants: National Tsing Hua University, Hsinchu (TW); Chang Chun Plastics Co., Ltd., Taipei (TW); Chang Chun Petrochemical Co., Ltd., Taipei (TW); DAIREN CHEMICAL CORP., Taipei (TW)

(72) Inventors: Chi-Chang Hu, Hsinchu (TW); Chen-Wei Tai, Hsinchu (TW); Tien-Yu Yi, Hsinchu (TW); An-Pang Tu, Taipei (TW); Ping-Chieh Wang, Taipei (TW)

(73) Assignees: NATIONAL TSING HUA UNIVERSITY, Hsinchu (TW); CHANG CHUN PETROCHEMICAL CO., LTD., Taipei (TW); CHANG CHUN PLASTICS CO., LTD., Taipei (TW); DAIREN CHEMICAL CORP., Taipei (TW)

( * ) Notice: Subject to any disclaimer, the term of this patent is extended or adjusted under 35 U.S.C. 154(b) by 78 days.

(21) Appl. No.: 17/522,151

(22) Filed: Nov. 9, 2021

(65) Prior Publication Data

US 2023/0094647 A1 Mar. 30, 2023

(30) Foreign Application Priority Data

Sep. 24, 2021 (TW) ................. 110135633

(51) Int. Cl.
*H01M 4/133* (2010.01)
*H01M 4/587* (2010.01)
(Continued)

(52) U.S. Cl.
CPC ............. *H01M 4/133* (2013.01); *C01B 32/05* (2017.08); *H01M 4/587* (2013.01);
(Continued)

(58) Field of Classification Search
CPC ................. H01M 4/133; H01M 4/587; H01M 2004/021; H01M 2004/027; C01B 32/05;
(Continued)

(56) References Cited

U.S. PATENT DOCUMENTS

2009/0140214 A1* 6/2009 Sonobe ................. H01M 4/587
252/511

FOREIGN PATENT DOCUMENTS

| CN | 101384508 A | 3/2009 |
|---|---|---|
| CN | 100477345 C | 4/2009 |
| CN | 103435896 A | 12/2013 |

OTHER PUBLICATIONS

Wang et al., Properties and sodium insertion behavior of Phenolic Resin-based hard carbon microspheres obtained by a hydrothermal method, 2015, J. Electroanal. Chem., 755, 87-91 (Year: 2015).*

(Continued)

*Primary Examiner* — Daniel S Gatewood
(74) *Attorney, Agent, or Firm* — WPAT, P.C

(57) ABSTRACT

Provided are hard carbon beads, their preparation method, and an energy storage device comprising the same. Microwave heating is used to synthesize cross-linked phenolic formaldehyde for reducing energy consumption and controlling the crosslinking density of cured phenolic formaldehyde. The problems caused by high temperature heating and hydrothermal process for curing resin can be solved by the instant disclosure, which can increase the economic values of electrode and energy storage device comprising the hard carbon beads.

19 Claims, 13 Drawing Sheets

(51) Int. Cl.
*C01B 32/05* (2017.01)
*H01M 4/02* (2006.01)

(52) U.S. Cl.
CPC ...... *C01P 2002/60* (2013.01); *C01P 2002/72* (2013.01); *C01P 2002/82* (2013.01); *C01P 2004/03* (2013.01); *C01P 2004/04* (2013.01); *C01P 2004/51* (2013.01); *C01P 2004/61* (2013.01); *C01P 2006/40* (2013.01); *H01M 2004/021* (2013.01); *H01M 2004/027* (2013.01)

(58) Field of Classification Search
CPC .............. C01P 2002/60; C01P 2002/72; C01P 2002/82; C01P 2004/03; C01P 2004/04; C01P 2004/51; C01P 2004/61; C01P 2006/40; Y02E 60/10
See application file for complete search history.

(56) References Cited

OTHER PUBLICATIONS

Jin et al.,High-Performance Hard Carbon Anode:Tunable Local Structures and Sodium Storage Mechanism, 2018, Appl. Energy Mater., 1, 2295-2305 (Year: 2018).*
Taiwan Patent Office, Office Action dated Jan. 10, 2022.
He-liangWang et al., Properties and sodium insertion behavior of Phenolic Resin-based hard carbon microspheres obtained by a hydrothermal method, Jul. 26, 2015.
Yu Jin et al., High-Performance Hard Carbon Anode: Tunable Local Structures and Sodium Storage Mechanism, Apr. 26, 2018.
Arjun Singh et al., Synthesis of resole-type phenolic beads from phenol and formaldehyde by suspension polymerization technique, Jan. 23, 2009.
Taiwan Patent Office, Approval letter dated Mar. 18, 2022.

* cited by examiner ated by: (a) dissolving phenol-formaldehyde resin, a cross-linking reagent and a protection reagent into a solvent to form a mixture and heating the mixture by microwave for cross-linking reaction to obtain a suspension containing phenol-formaldehyde beads, wherein the phenol-formaldehyde resin is set to be 100 parts by weight, the cross-linking reagent is greater than or equal to 5 parts by weight and less than or equal to 70 parts by weight, the protection reagent is greater than or equal to 1 part by weight and less than or equal to 10 parts by weight, the heating temperature of microwave is greater than or equal to 100° C. and less than or equal to 180° C., the cross-linking reagent is selected from the group consisting of: hexamethylenetetramine (HMTA), formaldehyde acetal, furfural, furfural alcohol and trimethylol phosphine oxide, and the protection reagent is selected from the group consisting of: polyvinyl alcohol (PVA), methyl cellulose (MC) and polyoxyethylene polyoxypropylene (POE-POP);

HARD CARBON BEADS, THEIR PREPARATION, AND ENERGY STORAGE DEVICE COMPRISING THE SAME

CROSS-REFERENCE TO RELATED APPLICATION

Pursuant to 35 U.S.C. § 119(a), this application claims the benefits of the priority to Taiwan Patent Application No. 110135633, filed Sep. 24, 2021. The contents of the prior application are incorporated herein by its entirety.

BACKGROUND OF THE INVENTION

1. Field of the Invention

The instant disclosure relates to hard carbon beads, their preparation, and an energy storage device comprising the same, more particularly to hard carbon beads for storage of lithium ion or sodium ion, their preparation, and an energy storage device comprising the same.

2. Description of the Prior Arts

To solve the problems of energy shortage and increasing demand for electricity, people have put lots of effort on researches of high performance energy storage systems. Since lithium ion batteries (LIBs) have high energy density, high power density, and acceptable charge-discharge cycle life, they are widely used in various electronic products. Since sodium ion batteries (SIBs) have merits of high security, low cost and rich reserve of sodium raw material, they become highly valued new generation batteries.

Carbon usually serves as an active material in the negative electrode of a lithium ion battery. Carbon negative electrode material can be divided into natural graphite, artificial graphite, graphite-like carbon, and amorphous carbon material, and amorphous carbon material comprises soft carbon and hard carbon. Common precursors of hard carbon are artificial polymer and biomass. However, hard carbon produced by biomass has problems of uneven structure and difficulty of control due to impurity in biomass. Structure of hard carbon produced by artificial polymer can be controlled, which is beneficial to modify the property of lithium ion batteries.

Nowadays, artificial polymer needs to undergo pretreatment of cross-linking reaction before carbonization in production of hard carbon. However, conventional cross-linking reaction is carried out by heat treatment of 150° C. to 200° C. or long-term hydrothermal method for 6 hours to 24 hours. In addition to the defects of high energy consumption and uncontrollable curing extent, long staying in high temperature environment easily causes undesired side reaction. Aforesaid side reaction makes the hard carbon not suitable for lithium ion batteries or sodium ion batteries.

SUMMARY OF THE INVENTION

In view of this, an objective of the instant disclosure is to prepare hard carbon beads by adopting a microwave-assisted hydrothermal method instead of the conventional hydrothermal method at high temperature. Microwave-assisted hydrothermal method can carry out fast cross-linking reactions. By aforesaid method, energy consumption can be reduced and the curing extent of obtained hard carbon beads can be controlled.

To achieve aforementioned objective, the instant disclosure provides a method of preparing hard carbon beads comprising:

step (a): dissolving phenol-formaldehyde resin, a cross-linking reagent and a protection reagent into a solvent to form a mixture and heating the mixture by microwave for cross-linking reaction to obtain a suspension containing phenol-formaldehyde beads, wherein the phenol-formaldehyde resin is set to be 100 parts by weight, the cross-linking reagent is greater than or equal to 5 parts by weight and less than or equal to 70 parts by weight, the protection reagent is greater than or equal to 1 part by weight and less than or equal to 10 parts by weight, the heating temperature of microwave is greater than or equal to 100° C. and less than or equal to 180° C., the cross-linking reagent is selected from the group consisting of: hexamethylenetetramine (HMTA), formaldehyde acetal, furfural, furfural alcohol and trimethylol phosphine oxide, and the protection reagent is selected from the group consisting of: polyvinyl alcohol (PVA), methyl cellulose (MC) and polyoxyethylene polyoxypropylene (POE-POP);

step (b): drying the suspension containing phenol-formaldehyde beads to obtain phenol-formaldehyde beads; and step (c): subjecting the phenol-formaldehyde beads for carbonization under inert gas to obtain the hard carbon beads, wherein the carbonization temperature is greater than or equal to 500° C. and less than or equal to 1500° C.

By using the microwave-assisted hydrothermal method, fast cross-linking reaction of phenol-formaldehyde resin with moderate cross-linking reagent and protection reagent is carried out, which is beneficial to control cross-linking extent, to shorten the processing time and to save energy. Besides, carbonization under the atmosphere of inert gas and moderate temperature contributes to controllable graphitization extent of hard carbon beads, which makes the hard carbon beads have specific micro-graphitic structures and closed micropores. According to this, the hard carbon beads obtained by the method of the instant disclosure have good storage ability for lithium ion or sodium ion and render the lithium ion battery, sodium ion battery, lithium ion capacitor, and sodium ion capacitor enhanced economic values.

It should be explained that excess cross-linking reagent makes the cross-linking density of phenol-formaldehyde resin become uneven, which contributes to massive standard deviation of particle size of the obtained hard carbon beads. It should be explained that too high carbonization temperature makes some of the hard carbon beads subject to severe heat treatment, which contributes to massive standard deviation of particle size of the obtained hard carbon beads. However, carbonization without adequate temperature fails to make the obtained hard carbon beads have well-developed micro-graphitic structure.

Preferably, the number-average molecular weight (Mn) of aforesaid phenol-formaldehyde resin may be greater than or equal to 200 and less than or equal to 10000 and the viscosity of aforesaid phenol-formaldehyde resin may be greater than or equal to 35 cps and less than or equal to 2100 cps. In one of the embodiments, the Mn of aforesaid phenol-formaldehyde resin may be greater than or equal to 200 and less than or equal to 3000. In another embodiment, the Mn of aforesaid phenol-formaldehyde resin may be greater than or equal to 3000 and less than or equal to 10000.

According to the instant disclosure, aforesaid phenol-formaldehyde resin may be phenol-formaldehyde resin without nitrogen doping or nitrogen-doped phenol-formaldehyde resin. Aforesaid phenol-formaldehyde resin without nitrogen doping does not comprise any amino group or heteroaryl group comprising nitrogen. The Mn of phenol-formaldehyde resin without nitrogen doping may be greater than or equal to 200 and less than or equal to 3000. Aforesaid nitrogen-doped phenol-formaldehyde resin may comprise amino group, heteroaryl group comprising nitrogen or the combination thereof. The Mn of nitrogen-doped phenol-formaldehyde resin may be greater than or equal to 2000 and less than or equal to 4000.

According to the instant disclosure, aforesaid cross-linking reagent is a reagent which can be decomposed to an aldehyde during reaction. For example, aforesaid aldehyde is formaldehyde. Preferably, the phenol-formaldehyde resin is set to be 100 parts by weight in aforesaid step (a), the cross-linking reagent may be greater than or equal to 5 parts by weight and less than or equal to 50 parts by weight. More preferably, the phenol-formaldehyde resin is set to be 100 parts by weight in aforesaid step (a), the cross-linking reagent may be greater than or equal to 5 parts by weight and less than or equal to 30 parts by weight.

The function of protection reagent added in the method of preparing hard carbon beads of the instant disclosure is dispersing the phenol-formaldehyde resin evenly, which makes the extent of cross-linking reaction become controllable. Preferably, aforesaid protection reagent may be greater than or equal to 2.5 parts by weight and less than or equal to 7.5 parts by weight. Preferably, the protection reagent may be polyvinyl alcohol.

Aforesaid solvent may comprise 0 vol % to 100 vol % water and 0 vol % to 100 vol % alcohol and aforesaid alcohol may be methanol, ethanol or the combination thereof. In one of the embodiments, aforesaid solvent may comprise only one solvent (as known as single-solvent system). That is, aforesaid solvent may be water, methanol or ethanol. Single-solvent system is suitable for the phenol-formaldehyde resin without nitrogen doping having Mn of 200 to 3000. In another embodiment, aforesaid solvent may comprise two solvents (as known as double-solvent system). That is, aforesaid solvent may comprise 20 vol % to 80 vol % water and 20 vol % to 80 vol % methanol or 20 vol % to 80 vol % water and 20 vol % to 80 vol % ethanol. Double-solvent system is suitable for the nitrogen-doped phenol-formaldehyde resin having Mn of 2000 to 4000.

Preferably, the heating temperature of microwave in aforesaid step (a) may be greater than or equal to 110° C. and less than or equal to 140° C.

Preferably, the power of microwave in aforesaid step (a) may be greater than or equal to 60 watt and less than or equal to 100 watt.

Preferably, the microwave heating time in aforesaid step (a) may be greater than or equal to 5 minutes and less than or equal to 60 minutes. Compared to the conventional hydrothermal method for preparing hard carbon beads, the fast cross-linking reaction promoted by the microwave-assisted hydrothermal method is beneficial to save energy and to shorten the processing time in production. In one of the embodiments, the microwave heating time in aforesaid step (a) may be greater than or equal to 15 minutes and less than or equal to 30 minutes.

The drying method in aforesaid step (b) does not have any specific limitation. Aforesaid drying method may be air dry or drying at 60° C. to 90° C.

The inert gas in aforesaid step (c) does not have any specific limitation. For example, aforesaid inert gas may be nitrogen or argon.

Specifically, the carbonization temperature in step (c) may be 600° C. to 1500° C., 700° C. to 1200° C. or 800° C. to 1000° C.

In one of the embodiments, the carbonization in step (c) may be carried out in aforesaid temperature for 1 hour to 10 hours. In another embodiment, the carbonization in step (c) may be carried out in aforesaid temperature for 5 hours to 8 hours.

Besides, the instant disclosure provides a hard carbon bead having a maximum particle size and a minimum particle size, wherein a ratio of the maximum particle size to the minimum particle size is greater than or equal to 1 and less than or equal to 1.1.

In the present specification, aforesaid maximum particle size and minimum particle size are the particle sizes measured from the lines through the center of the same hard carbon bead. If the ratio of the maximum particle size to the minimum particle size is approximate to 1, the hard carbon bead is close to an ideal sphere.

Preferably, aforesaid hard carbon bead may be in the shape of a ball.

In one of the embodiments, aforesaid hard carbon bead may have a ratio of maximum particle size to minimum particle size greater than or equal to 1.021 and less than or equal to 1.098.

In one of the embodiments, aforesaid hard carbon bead may have an average group particle size greater than or equal to 3.5 μm and less than or equal to 4.8 μm. In another embodiment, aforesaid hard carbon bead may have an average group particle size greater than or equal to 3.8 μm and less than or equal to 4.6 μm.

In one of the embodiments, aforesaid hard carbon bead may have a standard deviation of particle size greater than or equal to 1.2 μm and less than or equal to 2.8 μm.

In one of the embodiments, the graphitic length $L_a$ may be greater than or equal to 2.9 nm and less than or equal to 3.5 nm. In another embodiment, the graphitic length $L_a$ may be greater than or equal to 3.0 nm and less than or equal to 3.4 nm.

In one of the embodiments, the Raman spectrum of aforesaid hard carbon bead has D1 band and G band. The ratio of the intensity of D1 band to the intensity of G band may be greater than or equal to 2.0 and less than or equal to 2.5.

According to the instant disclosure, the hard carbon beads obtained from aforesaid method may apply to negative electrode for the lithium ion battery, sodium ion battery, lithium ion capacitor and sodium ion capacitor.

The instant disclosure provides an energy storage device comprising a negative electrode and a lithium foil as a counter electrode, wherein the negative electrode comprises aforesaid hard carbon beads, the Galvanostatic charge-discharge curve (GCD curve) of the energy storage device comprises a plateau region ranging from 0.003 V to 0.12 V and a sloping area ranging from 0.12 V to 1.5 V, the specific capacity of the plateau region is greater than or equal to 90 mAh/g and less than or equal to 220 mAh/g, and the specific capacity of the sloping area is greater than or equal to 120 mAh/g and less than or equal to 320 mAh/g.

The energy storage device of the instant disclosure comprises a lithium ion battery, a sodium ion battery, a lithium ion capacitor, and a sodium ion capacitor. Since the GCD curve of the energy storage device has a significant plateau region and sloping area, the energy storage device has a higher total specific capacity (200 mAh/g to 500 mAh/g).

Preferably, the energy storage device may have a total specific capacity greater than or equal to 280 mAh/g and less than or equal to 500 mAh/g.

In one of the embodiments, the energy storage device is a lithium ion battery. The specific capacity of the plateau region may be greater than or equal to 90 mAh/g and less than or equal to 220 mAh/g and the specific capacity of sloping area may be greater than or equal to 120 mAh/g and less than or equal to 290 mAh/g.

In another embodiment, the energy storage device is a sodium ion battery. The specific capacity of the plateau region may be greater than or equal to 90 mAh/g and less than or equal to 120 mAh/g and the specific capacity of sloping area may be greater than or equal to 120 mAh/g and less than or equal to 150 mAh/g.

BRIEF DESCRIPTION OF THE DRAWING(S)

DETAILED DESCRIPTION OF THE PREFERRED EMBODIMENTS

Hereinafter, multiple examples are provided to illustrate the implementation of the method of preparing hard carbon beads of the instant disclosure, while multiple comparative examples are provided as comparison. A person having ordinary skill in the art can easily realize the advantages and effects of the instant disclosure from the following examples and comparative examples. The descriptions proposed herein are just preferable embodiments for the purpose of illustrations only, not intended to limit the scope of the instant disclosure. Various modifications and variations could be made in order to practice or apply the instant disclosure without departing from the spirit and scope of the instant disclosure.

《 Hard Carbon Bead 》

EXAMPLES 1 to 10

Figure 1:
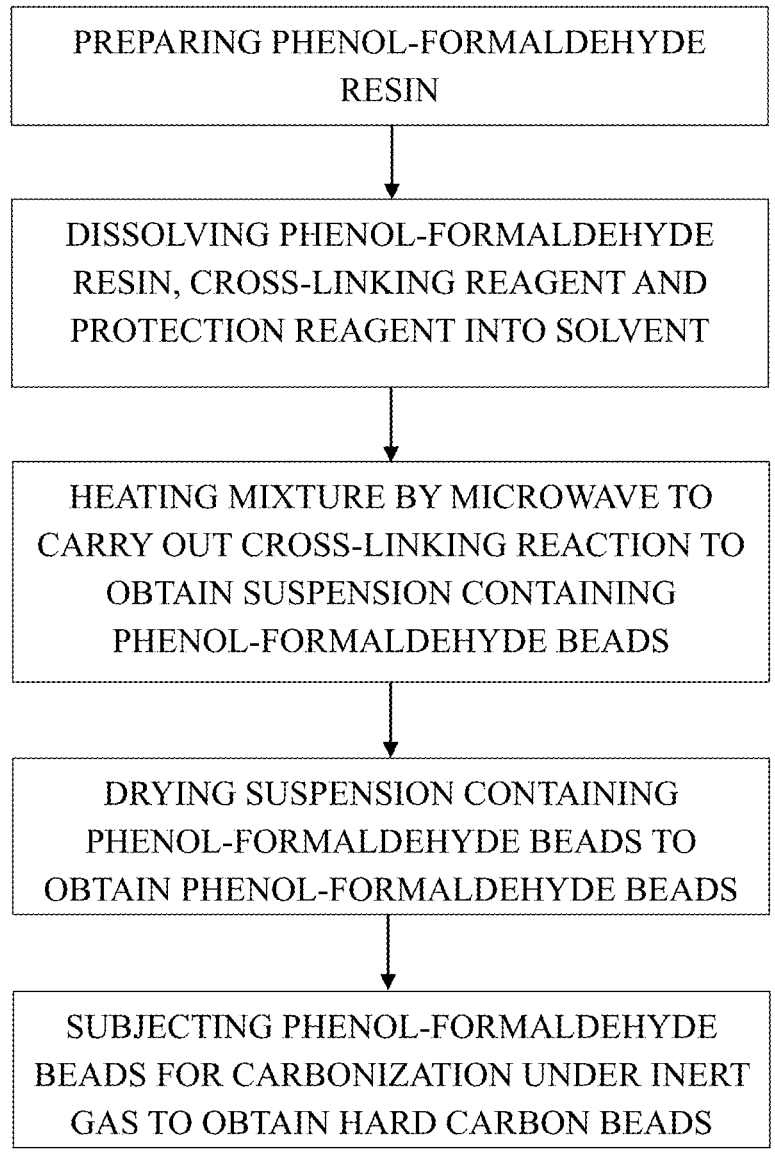
FIG. 1 is a flow chart of a method of preparing hard carbon beads.
Figure 2A:
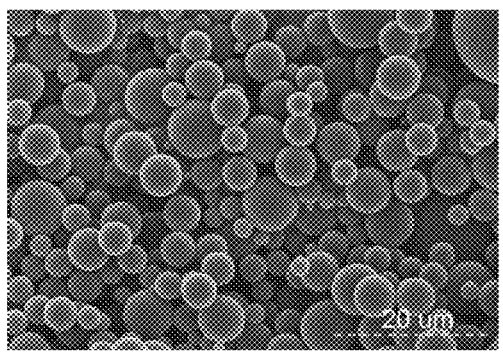
FIG. 2A to FIG. 2L are field-emission scanning electron microscope (FE-SEM) images of Examples 1 to 12 in order.
Figure 2B:
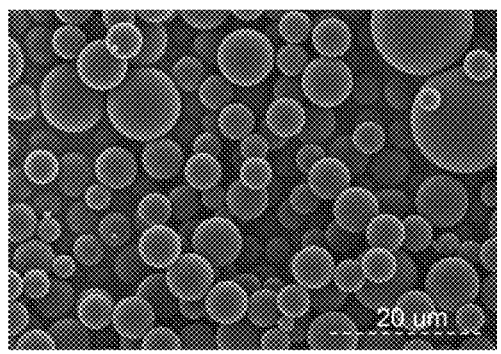
Figure 2C:
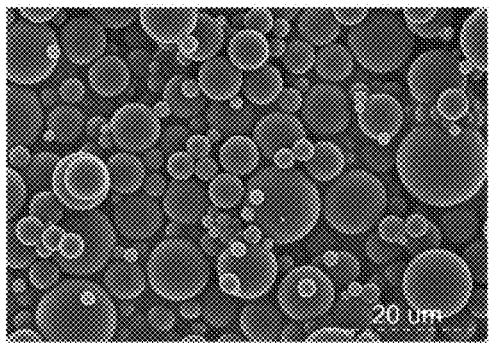
Figure 2D:
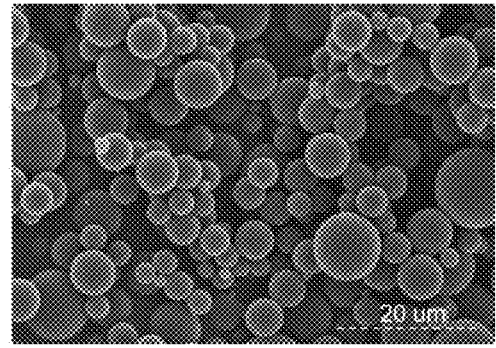
Figure 2E:
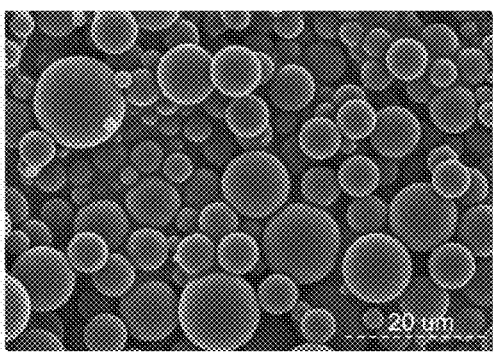
Figure 2F:
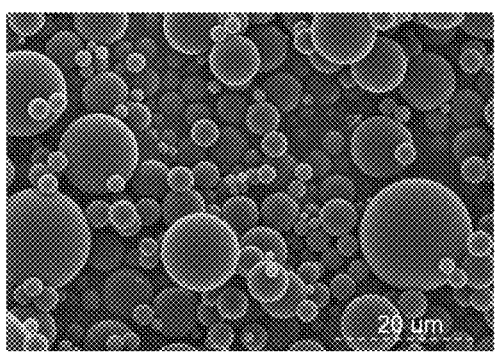
Figure 2G:
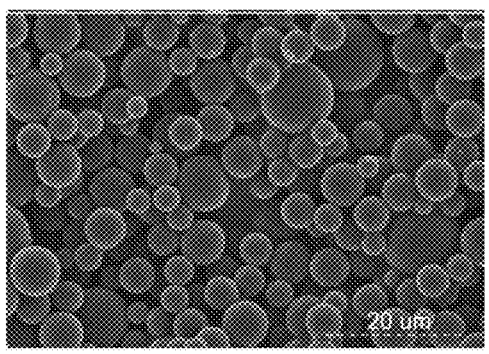
Figure 2H:
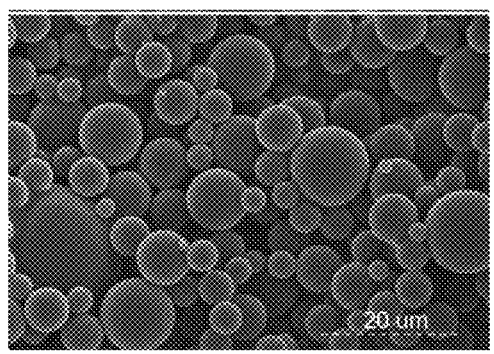
Figure 2I:
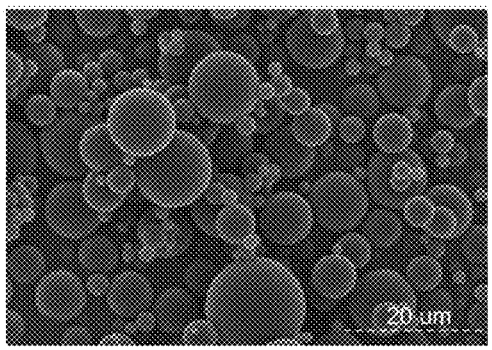
Figure 2J:
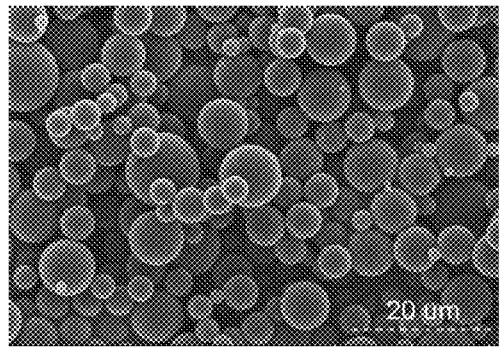
Figure 2K:
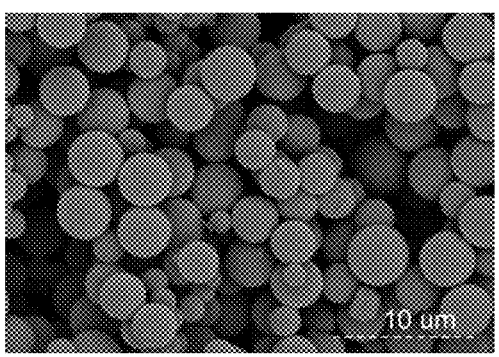
Figure 2L:
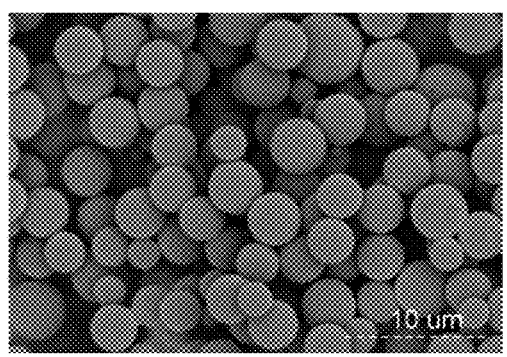

Phenolic-formaldehyde resin was used as starting material of Examples 1 to 10. By microwave-assisted hydrothermal method, fast cross-linking reaction was carried out and phenolic-formaldehyde beads in ball shape were obtained. Then after carbonization at appropriate temperature, Examples of hard carbon beads were obtained. With reference to FIG. 1, the manufacturing process of Examples 1 to 10 was described as follows.

First, 846 g phenol (9 mol) and 1600 g of 30 wt % formaldehyde solution (16 mol) were mixed at 20° C. 38 wt % concentrated sodium hydroxide solution (about 110 ml) was added to aforesaid mixture with constant stirring and the pH value of the mixture was adjusted to be 9.5 to 10. Then the mixture was heated at 60° C. for 4 hours. After the reaction ended, the mixture was analyzed by titration and only 1 wt % formaldehyde was detected. Then aforesaid mixture was cooled down, about 5 wt % hydrochloric acid was added with constant stirring and the pH value of the mixture became almost neutral. Aforesaid mixture should not be acidic. Specifically, the pH value of the mixture should be about 7.2 to 7.5. Afterwards, water and excess phenol were evaporated under vacuum and the inner temperature reached about 60° C. Finally, 1360 g of viscous resin known as phenol-formaldehyde resin without nitrogen doping was obtained. Herein, the phenol-formaldehyde resin without nitrogen doping had a number average molecular weight around 200 and the viscosity around 35 cps.

Afterwards, 0.8 g phenol-formaldehyde resin without nitrogen doping was dissolved in 0.2 g methanol to obtain 1 g of 80 wt % phenol-formaldehyde resin solution without nitrogen doping. Phenol-formaldehyde resin without nitrogen doping was set to be 100 parts by weight. 5 parts by weight polyvinyl alcohol and 10 parts by weight to 50 parts by weight HMTA (vendor: SHOWA) were added to 1 g of 80 wt % phenol-formaldehyde resin solution without nitrogen doping. 19 ml deionized water was added to aforesaid mixture and the mixture was transferred to a reaction tube. The reaction tube was sealed with a lid and placed in a focused microwave reactor (model: CEM discover). The temperature of the focused microwave reactor was about 130° C., the power of the focused microwave reactor was about 60 watt, and the time of heating and constant stirring was 20 minutes. By microwave-assisted hydrothermal method, fast cross-linking reaction was carried out and a suspension containing phenol-formaldehyde beads without nitrogen doping was obtained.

Afterward, aforesaid suspension containing phenol-formaldehyde beads without nitrogen doping was cooled down to room temperature. Yellow phenol-formaldehyde beads without nitrogen doping were significantly suspended within aforesaid suspension. The suspension containing phenol-formaldehyde beads without nitrogen doping was rinsed by acetone two to three times and then aforesaid suspension was filtered. The solid product was obtained and placed in an 80° C. oven. After drying for 24 hours, phenol-formaldehyde beads without nitrogen doping were obtained.

Finally, aforesaid phenol-formaldehyde beads without nitrogen doping were put in a high-temperature furnace. The temperature of the high-temperature furnace was set to be about 600° C. to 1000° C. The temperature of the high-temperature furnace was raised at the speed of 1° C. to 50° C. per minute to the target temperature in nitrogen atmosphere. Carbonization was carried out at the target temperature for 6 hours and each Example of hard carbon beads was obtained.

The differences between Examples 1 to 10 were recruitment of HMTA and carbonization temperature. The parameters were shown in Table 1.

TABLE 1 recruitment of phenol-for maldehyde resin and cross-linking reagent and caronization temperature of Examples 1 to 10 (E1 to E10)

|  | Amount of phenol-formaldehyde resin (part by weight) | Amount of cross-linking reagent (part by weight) | Carbonization temperature |
|---|---|---|---|
| E1 | 100 | 10 | 800° C. |
| E2 | 100 | 25 | 800° C. |
| E3 | 100 | 50 | 800° C. |
| E4 | 100 | 10 | 900° C. |
| E5 | 100 | 25 | 900° C. |
| E6 | 100 | 50 | 900° C. |
| E7 | 100 | 10 | 1000° C. |
| E8 | 100 | 25 | 1000° C. |
| E9 | 100 | 50 | 1000° C. |
| E10 | 100 | 10 | 600° C. |

EXAMPLES 11 to 12

Examples 11 to 12 of hard carbon beads were rapidly produced by a similar microwave-assisted hydrothermal method and carbonization as stated in Examples 1 to 10. The differences were described as follows. (1) Different phenol-formaldehyde resin was used as starting material. (2) Polyvinyl alcohol was not added. The manufacturing process of Examples 11 to 12 was described as follows.

First, 0.8 g nitrogen-doped phenol formaldehyde resin (vendor: DIC Corporation, model: PHENOLITE LA-1356) was dissolved in methanol to obtain 1 g of 80 wt % nitrogen-doped phenol-formaldehyde resin solution. Nitrogen-doped phenol-formaldehyde resin was set to be 100 parts by weight. 70 parts by weight HMTA (vendor: SHOWA) was added to 1 g of 80 wt % nitrogen-doped phenol formaldehyde resin solution. 9.5 ml ethanol and 9.5 ml deionized water (total 19 ml liquid) were added to aforesaid mixture and the mixture was transferred to a reaction tube. The reaction tube was sealed with a lid and placed in a focused microwave reactor (model: CEM discover). The temperature of the focused microwave reactor was about 130° C., and the time of heating and constant stirring was 20 minutes. By microwave-assisted hydrothermal method, fast cross-linking reaction was carried out and a suspension containing nitrogen-doped phenol-formaldehyde beads was obtained.

Afterward, aforesaid suspension containing nitrogen-doped phenol-formaldehyde beads was cooled down to room temperature. Yellow nitrogen-doped phenol-formaldehyde beads were significantly suspended within aforesaid suspension. The suspension containing nitrogen-doped phenol-formaldehyde beads was rinsed by acetone two to three times and then aforesaid suspension was filtered. The solid product was obtained and placed in an 80° C. oven. After drying for 24 hours, nitrogen-doped phenol-formaldehyde beads were obtained.

Finally, aforesaid nitrogen-doped phenol-formaldehyde beads were put in a high-temperature furnace. The temperature of the high-temperature furnace was set to be about 900° C. to 1000° C. The temperature of the high-temperature furnace was raised at the speed of 1° C. to 50° C. per minute to the target temperature in nitrogen atmosphere. Carbonization was carried out at the target temperature for 6 hours and Examples 11 and 12 of hard carbon beads were obtained.

The difference between Examples 11 and 12 was the carbonization temperature. The carbonization temperature was 900° C. in Example 11 and the carbonization temperature was 1000° C. in Example 12.

TEST EXAMPLE 1

Analysis of Particle Size

Field-emission scanning electron microscope (vendor: Hitachi, model: SU8010) was used to observe Examples 1 to 12 of hard carbon beads in the test example. The results were shown as FIG. 2A to FIG. 2L in order. As shown in FIG. 2A to FIG. 2L, Examples 1 to 12 of hard carbon beads obtained by aforesaid manufacturing process were classic ball type hard carbon materials.

TEST EXAMPLE 1-1

Average Particle Size of Single Particle and Standard Deviation of Particle Size of Single Particle IC Measure was used to analyze FIG. 2A to FIG. 2L. Three hard carbon beads were chosen as samples in each FIG. 100-time measurements were conducted from different angles to render the particle size of each hard carbon bead. Three hard carbon beads were a big hard carbon bead (with particle size ranging from 6 μm to 8 μm), a medium hard carbon bead (with particle size ranging from 5 μm to 6 μm), and a small hard carbon bead (with particle size ranging from 4 μm to 5 μm) respectively. Average particle size of single particle, standard deviation of particle size of single particle and ratio of maximum particle size to minimum particle size were rendered by 100 measurements of the big hard carbon bead, 100 measurements of the medium hard carbon bead, and 100 measurements of the small hard carbon bead. The results were shown as Table 2.

TABLE 2 average particle size of single particle, standard deviation of particle size of single particle and ratio of maximum particle size to minimum particle size of three kinds of particle sizes in FIG. 2A to FIG. 2L

| Sample | Big | Medium | Small |
|---|---|---|---|
| | E1 | | |
| Average particle size of single particle(μm) | 7.5145 | 5.6196 | 4.6109 |
| Standard deviation of particle size of single particle(μm) | 0.0959 | 0.0844 | 0.0872 |
| (Max particle size)/ (Min particle size) | 1.061 | 1.075 | 1.082 |

TABLE 2-continued average particle size of single particle, standard deviation of particle size of single particle and ratio of maximum particle size to minimum particle size of three kinds of particle sizes in FIG. 2A to FIG. 2L

| Sample | Big | Medium | Small |
|---|---|---|---|
| E2 | | | |
| Average particle size of single particle(μm) | 7.4525 | 5.6892 | 4.2131 |
| Standard deviation of particle size of single particle(μm) | 0.0841 | 0.0826 | 0.0941 |
| (Max particle size)/(Min particle size) | 1.021 | 1.054 | 1.046 |
| E3 | | | |
| Average particle size of single particle(μm) | 7.1244 | 5.4892 | 4.1563 |
| Standard deviation of particle size of single particle(μm) | 0.0845 | 0.0726 | 0.0941 |
| (Max particle size)/(Min particle size) | 1.035 | 1.071 | 1.056 |
| E4 | | | |
| Average particle size of single particle(μm) | 7.4122 | 5.2416 | 4.2394 |
| Standard deviation of particle size of single particle(μm) | 0.0852 | 0.0946 | 0.0975 |
| (Max particle size)/(Min particle size) | 1.033 | 1.059 | 1.045 |
| E5 | | | |
| Average particle size of single particle(μm) | 7.3243 | 5.2466 | 4.6289 |
| Standard deviation of particle size of single particle(μm) | 0.0963 | 0.0945 | 0.0961 |
| (Max particle size)/(Min particle size) | 1.084 | 1.065 | 1.074 |
| E6 | | | |
| Average particle size of single particle(μm) | 7.1023 | 5.3642 | 4.1256 |
| Standard deviation of particle size of single particle(μm) | 0.0841 | 0.0785 | 0.0772 |
| (Max particle size)/(Min particle size) | 1.023 | 1.056 | 1.044 |
| E7 | | | |
| Average particle size of single particle(μm) | 7.5124 | 5.0211 | 4.6987 |
| Standard deviation of particle size of single particle(μm) | 0.0855 | 0.0841 | 0.0942 |
| (Max particle size)/(Min particle size) | 1.054 | 1.069 | 1.085 |
| E8 | | | |
| Average particle size of single particle(μm) | 7.5142 | 5.2314 | 4.5866 |
| Standard deviation of particle size of single particle(μm) | 0.0845 | 0.0956 | 0.0825 |
| (Max particle size)/(Min particle size) | 1.045 | 1.066 | 1.098 |
| E9 | | | |
| Average particle size of single particle(μm) | 7.3654 | 5.3255 | 4.6236 |
| Standard deviation of particle size of single particle(μm) | 0.0586 | 0.0428 | 0.0652 |
| (Max particle size)/(Min particle size) | 1.032 | 1.087 | 1.062 |
| E10 | | | |
| Average particle size of single particle(μm) | 7.5823 | 5.0244 | 4.3289 |
| Standard deviation of particle size of single particle(μm) | 0.0521 | 0.0854 | 0.0751 |
| (Max particle size)/(Min particle size) | 1.095 | 1.068 | 1.072 |
| E11 | | | |
| Average particle size of single particle(μm) | 6.3255 | 5.4122 | 4.6858 |
| Standard deviation of particle size of single particle(μm) | 0.0856 | 0.0821 | 0.0925 |
| (Max particle size)/(Min particle size) | 1.085 | 1.073 | 1.062 |
| E12 | | | |
| Average particle size of single particle(μm) | 6.5546 | 5.3245 | 4.3328 |
| Standard deviation of particle size of single particle(μm) | 0.0868 | 0.0841 | 0.0855 |
| (Max particle size)/(Min particle size) | 1.091 | 1.083 | 1.088 |

As shown in Table 2, standard deviation of particle size of single particle of Examples 1 to 12 in the three kinds of particle sizes was less than 0.1 μm, which indicated that the values of particle size were centralized. The ratio of maximum particle size to minimum particle size of Examples 1 to 12 in the three kinds of particle sizes was greater than 1 and less than 1.1, which confirmed that Examples 1 to 12 of hard carbon beads were close to ideal ball type and different from conventional flake carbon material or lump carbon material.

TEST EXAMPLE 1-2

Average Group Particle Size and Standard Deviation of Particle Size

Afterwards, field-emission scanning electron microscope and IC Measure were used to analyze the polydispersity index (PDI) of FIG. 2A to FIG. 2L. The particle size distribution of Examples 1 to 12 of hard carbon beads was rendered. Average group particle size and standard deviation of particle size of Examples 1 to 12 were rendered by the particle size distribution. Aforesaid standard deviation was rendered by 100 samples of each Example. The results were shown in Table 3. To investigate the effect of recruitment of cross-linking reagent to particle size distribution of hard carbon beads, particle size distribution of Examples 1 to 3 was shown together in FIG. 3A. Besides, to investigate the effect of carbonization temperature to particle size distribution of hard carbon beads, particle size distribution of Examples 1, 4 and 7 was shown together in FIG. 3B.

TABLE 3 average group particle size and standard deviation of particle size of Examples to 12 (E1 to E12)

| | Average group particle size (μm) | Standard deviation of particle size (μm) |
|---|---|---|
| E1 | 4.16 | 1.49 |
| E2 | 4.56 | 1.36 |
| E3 | 3.89 | 2.51 |
| E4 | 4.33 | 1.22 |
| E5 | 4.21 | 1.42 |
| E6 | 4.14 | 2.34 |
| E7 | 4.51 | 2.01 |
| E8 | 4.35 | 2.14 |

TABLE 3-continued average group particle size and standard deviation
of particle size of Examples to 12 (E1 to E12)

| | Average group particle size (μm) | Standard deviation of particle size (μm) |
|---|---|---|
| E9 | 4.02 | 2.65 |
| E10 | 4.22 | 1.23 |
| E11 | 4.52 | 1.24 |
| E12 | 4.35 | 1.42 |

Figure 3A:
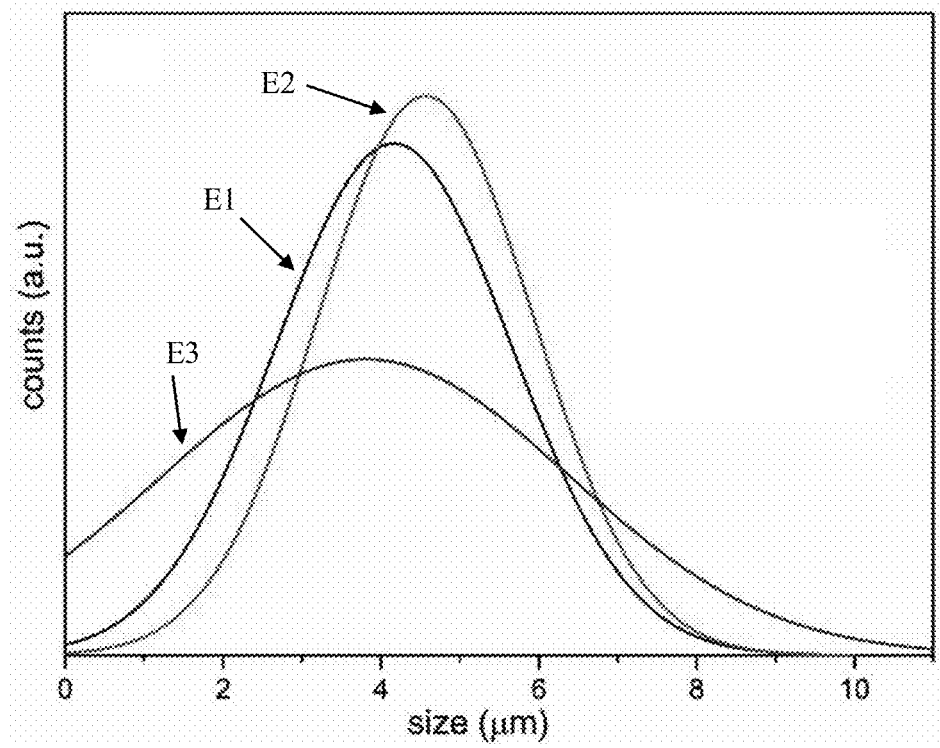
FIG. 3A is a particle size distribution graph of Examples 1 to 3.
Figure 3B:
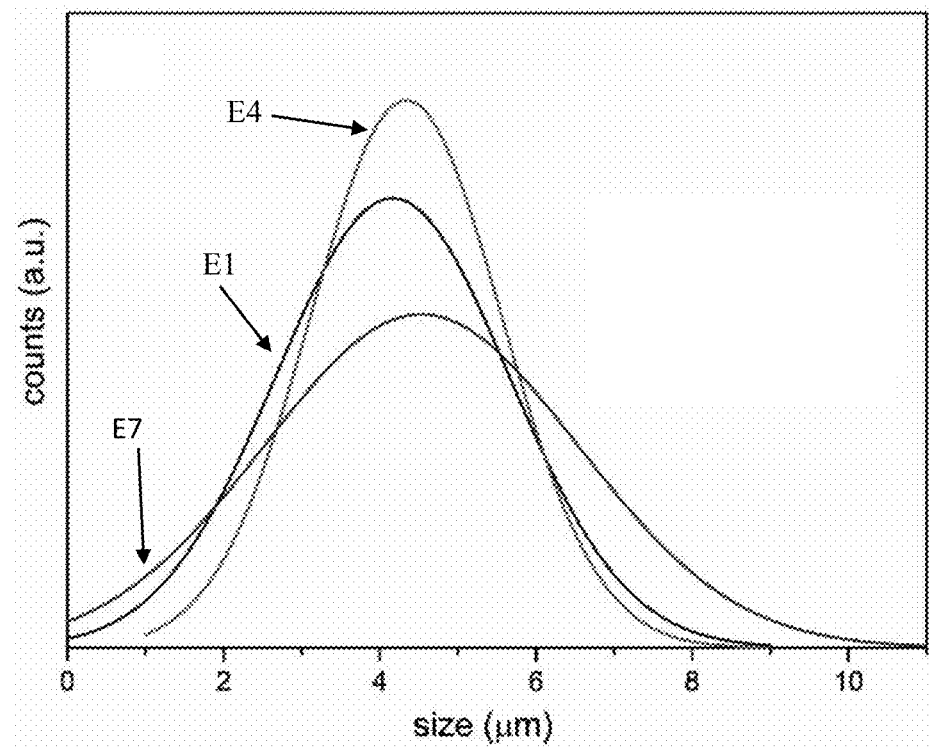
FIG. 3B is a particle size distribution graph of Examples 1, 4 and 7.

The results in Table 3 and FIG. 3A were further analyzed. The analysis result of Examples 1 to 9 indicated that as the recruitment of HMTA grew up, the hard carbon beads had slightly less average group particle size and greater standard deviation of particle size. The results in Table 3 and FIG. 3B were further analyzed. The analysis result indicated that as the carbonization temperature increased, the hard carbon beads had greater average group particle size. The results of standard deviation of particle size of Examples 1, 4 and 7 indicated that Example 7 had the highest standard deviation of particle size among the three due to the highest carbonization temperature.

TEST EXAMPLE 2

Closed Micropore

Figure 4A:
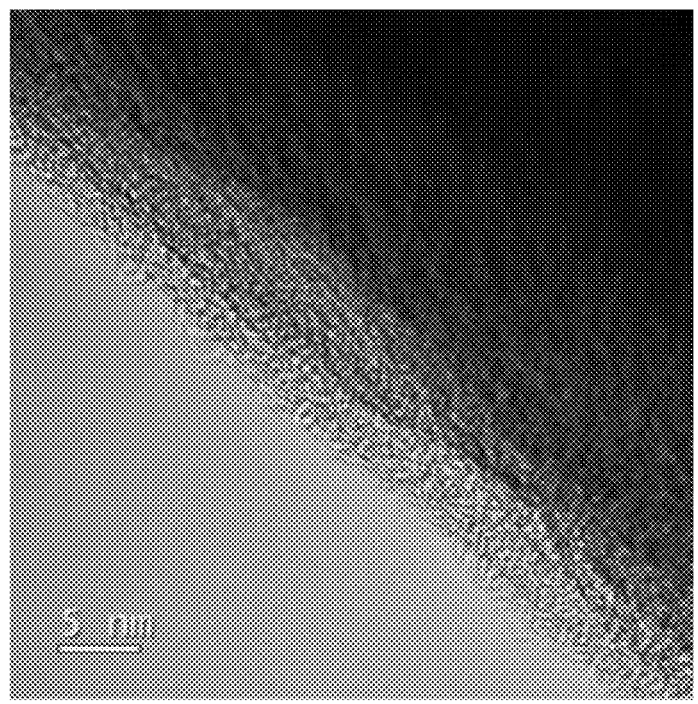
FIG. 4A is a high resolution transmission electron microscopy (HR-TEM) image of Example 1.
Figure 4B:
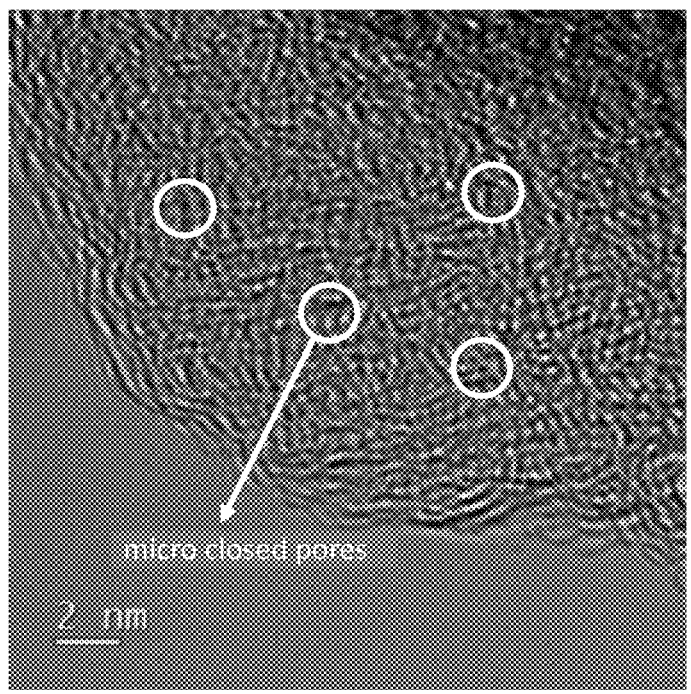
FIG. 4B is an image of partial enlargement of FIG. 4A.

The number of closed micropores in hard carbon beads and storage capacity of lithium ion and sodium ion were highly related. Transmission electron microscope (vendor: JEOL, model: JEM 2100F) was used to observe Example 1 of hard carbon beads in the test example. The HR-TEM and the partial enlargement thereof were shown as FIG. 4A and FIG. 4B. As shown in FIG. 4A and FIG. 4B, Example 1 of hard carbon bead had classic non-graphitizable carbon structure. That is, Example 1 had both amorphous areas and partially graphitized areas. There were micro-graphitic structures surrounded by nm-scale closed micropores shown as circle marks in FIG. 4B.

TEST EXAMPLE 3

Crystal Structure

X-ray diffractometer (vendor: Bruker, model: D8 Advance) was used to identify the crystal structures of Examples 1 to 4, and 7. A Cu Kα radiation source (λ=1.5405 Å) was used to measure aforesaid crystal structures. The results were shown as FIG. 5A and FIG. 5B.

Figure 5A:
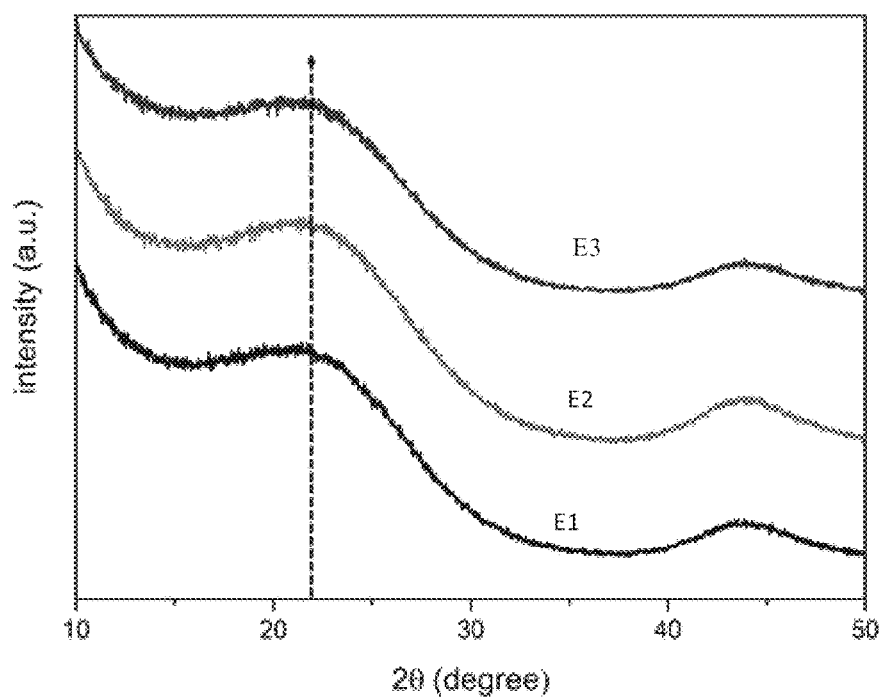
FIG. 5A is an X-ray diffraction (XRD) graph of Examples 1 to 3.
Figure 5B:
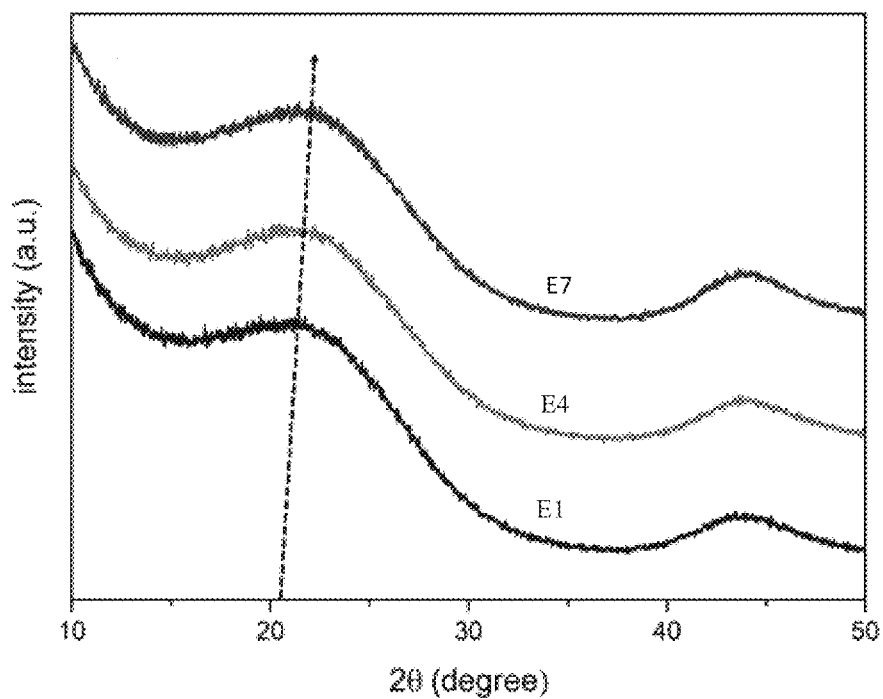
FIG. 5B is an X-ray diffraction (XRD) graph of Examples 1, 4 and 7.

The 2θ diffraction position of facet (002) and facet (100) ranged from 23° to 25° and 43° to 45° respectively. As shown in FIG. 5A and FIG. 5B, the characteristic peaks of facet (002) and facet (100) of Examples 1 to 4 and 7 were weak and broad compared to the ones of conventional graphitic material (MCMB), which indicated that aforesaid Examples had lots of amorphous areas, few graphene sheets and hollow closed micropores.

To investigate the influence of recruitment of cross-linking reagent and carbonization temperature to micro-graphitic structure of hard carbon bead, X-ray diffraction curves of Examples 1 to 4 and 7 were combined into FIG. 5A and FIG. 5B according to different categories. As shown in FIG. 5A, the 2θ diffraction position of facet (002) did not shift as cross-linking density of phenol-formaldehyde resin changed, which indicated nm-scale structure of hard carbon bead was basically not influenced by cross-linking density. As shown in FIG. 5B, the 2θ diffraction position of facet (002) shifted to right side (toward theoretical 2θ diffraction position of facet (002) which is 26.7°) as carbonization temperature increased. The results indicated that as carbonization temperature increased, the obtained nm-scale structure of hard carbon beads tended to form a perfect micro-graphitic structure.

Further analysis of XRD of Examples 1 to 9 was conducted to obtain $2\theta_{002}$ of facet (002) and $2\theta_{100}$ of facet (100). Interlayer d-spacing ($d_{002}$) was rendered by Bragg's equation: $n\lambda=2d_{002} \sin \theta_{002}$. $L_c$ (graphitic length along c-axis) was rendered by Scherrer's equation: $L_c=0.89\lambda/\beta_{002} \cos \theta_{002}$. $\beta_{002}$ was the full width at half maximum of facet (002) characteristic peak. $L_a$ (graphitic length along a-axis) was rendered by Scherrer's equation: $L_a=1.84\lambda/\beta_{100} \cos \theta_{100}$. $\beta_{100}$ was the full width at half maximum of facet (100) 5 characteristic peak. The results were shown in Table 4.

Figure 6:
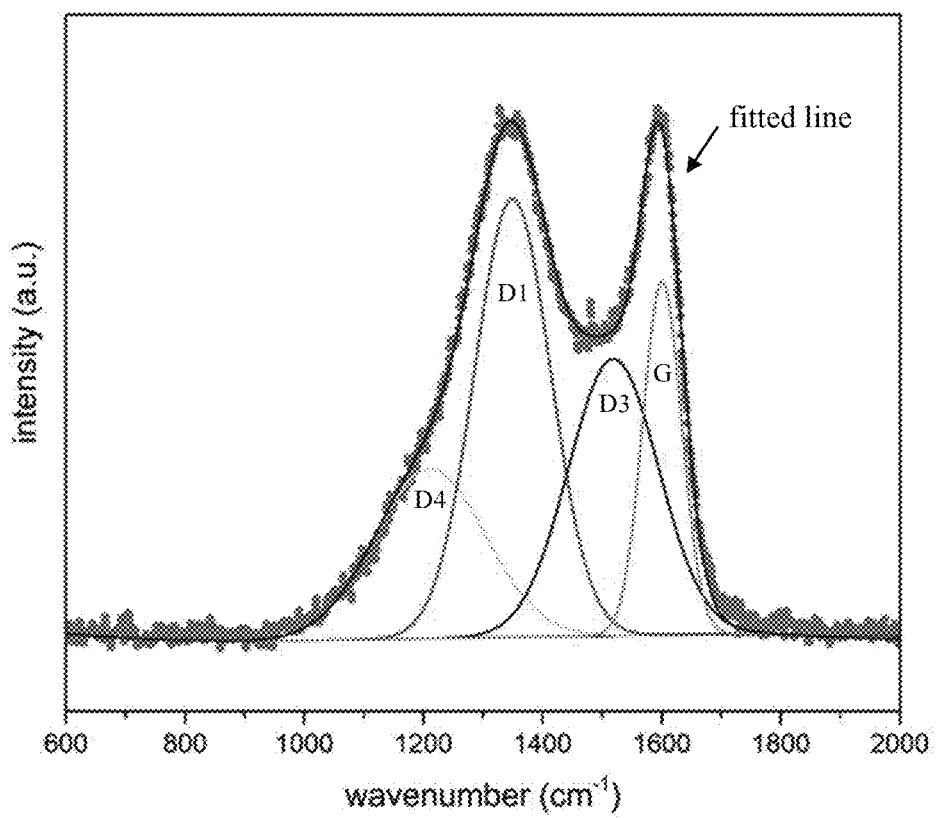
FIG. 6 is a Raman spectrum of Example 1.

Besides, Raman spectra (model: JY HR 800) of Examples 1 to 9 were used to analyze the disordering degree of carbon structure. Origin (fitting mode: Gaussian) was used to carry out fitting analysis. As shown in FIG. 6, D4 band (1210 cm$^{-1}$) was contributed by sp$^3$ bonds of C—C stretching, D1 band (1350 cm$^{-1}$) was contributed by defect of carbon structure, D3 band (1520 cm$^{-1}$) was contributed by sp$^2$ bonds of C—C stretching, and G band (1600 cm$^{-1}$) was contributed by micro-graphitic structure.

The ratio of the intensity of D1 band to the intensity of G band ($I_{D1}/I_G$) in Raman spectrum of each Example was used to evaluate the disordering degree of carbon structure. Aforesaid intensity of D1 band and intensity of G band were calculated by the signal areas of aforesaid two bands. The results were shown in Table 4.

TABLE 4

$2\theta_{002}$, $d_{002}$, $L_c$, $2\theta_{100}$, $L_a$ and $I_{D1}/I_G$ of Examples 1 to 9 (E1 to E9)

| | $2\theta_{002}$(°) | $d_{002}$(nm) | $L_c$(nm) | $2\theta_{100}$(°) | $L_a$(nm) | $I_{D1}/I_G$ |
|---|---|---|---|---|---|---|
| E1 | 22.442 | 0.39614 | 0.9597 | 43.878 | 3.0112 | 2.447 |
| E2 | 22.451 | 0.39599 | 0.9479 | 43.965 | 3.0082 | 2.367 |
| E3 | 22.475 | 0.39557 | 0.9836 | 44.049 | 2.9311 | 2.283 |
| E4 | 22.608 | 0.39328 | 0.9772 | 43.976 | 3.2704 | 2.434 |
| E5 | 22.631 | 0.39289 | 0.9459 | 43.922 | 3.2584 | 2.312 |
| E6 | 22.658 | 0.39242 | 0.9852 | 43.996 | 3.1501 | 2.241 |
| E7 | 22.935 | 0.38775 | 0.9371 | 43.982 | 3.3543 | 2.308 |
| E8 | 22.937 | 0.38780 | 0.9629 | 44.041 | 3.3234 | 2.198 |
| E9 | 22.938 | 0.38782 | 0.9500 | 44.005 | 3.3021 | 2.145 |

As shown in Table 4, as cross-linking density of phenol-formaldehyde resin grew up, $I_{D1}/I_G$ of hard carbon beads after carbonization was decreased. Aforesaid phenomenon indicated that the disordering degree was decreased. As shown in Table 4, each Raman spectrum of Examples 1 to 9 had D1 band and G band and the ratio of the intensity of D1 band to the intensity of G band was greater than or equal to 2.0 and less than or equal to 2.5.

As shown in Table 4, as cross-linking density of phenol-formaldehyde resin grew up, the graphitic length $L_a$ micro structure was decreased due to the influence of closed micropore of micro-graphitic structure. As shown in Table 4, the graphitic length $L_a$ micro structure of Examples 1 to 9 was greater than or equal to 2.9 nm and less than or equal to 3.5 nm.

《 Negative Electrode 》

EXAMPLES 1A TO 12A

Hard carbon beads of Examples 1 to 12 were used as negative electrode active material for preparing negative electrodes of Examples 1A to 12A. Each negative electrode of lithium ion batteries was obtained through following manufacturing process. The manufacturing process of Examples 1A to 12A was described as follows.

First, aforesaid hard carbon beads, carbon black (model: XC-72) and polyvinylidene fluoride (PVDF) were mixed at weight ratio of 85:5:10. Aforesaid mixture was dissolved in N-methyl-2-pyrrolidone (NMP) and the weight ratio of solid to liquid was 1:8. Then the negative electrode slurry was obtained.

Afterwards, the negative electrode slurry was coated on a copper foil by doctor blade method. The amount of hard carbon beads on the copper foil was around 2 mg per square centimeter. Then the copper foil coated with negative electrode slurry was placed in 80° C. vacuum environment for 24-hour drying to obtain a negative electrode containing hard carbon beads.

COMPARATIVE EXAMPLE 1A AND 2A

Negative electrodes of Comparative Examples 1A and 2A and Negative electrodes of Examples 1A to 12A were almost the same. The differences were that commercial mesocarbon microbeads (MCMB, vendor: China Steel Chemical Corporation, model: MG11) was used as negative electrode active material in Comparative Example 1A and that commercial soft carbon (vendor: China Steel Chemical Corporation, model: MSC-2) was used as negative electrode active material in Comparative Example 2A.

❰ Lithium Ion Battery ❱

EXAMPLES 1B TO 9B, 11B TO 12B

Negative electrodes of Examples 1A to 9A and 11A to 12A with same kind of positive electrode and electrolyte were used for preparing lithium ion batteries of Examples 1B to 9B and 11B to 12B respectively. The manufacturing process of Examples 1B to 9B and 11B to 12B were described as follows.

Coin cell (model: CR2032) was used and aforesaid negative electrode and lithium foil (counter electrode) were divided by a glass fiber (grade: GF/A). Lithium hexafluorophosphate ($LiPF_6$) was dissolved in a mixture of ethylene carbonate (EC), ethyl methyl carbonate (EMC) and dimethyl carbonate (DMC) (volume ratio: 1:1:1) to obtain 1M $LiPF_6$ solution as electrolyte. 1 wt % vinylene carbonate (VC) was added in aforesaid electrolyte. 80 μl aforesaid electrolyte was added to the coin cell in argon atmosphere (contents of moisture and oxygen less than 0.1 ppm) to obtain lithium ion batteries of Examples 1B to 9B and 11B to 12B. The content of water in aforesaid electrolyte was less than 10 ppm by measurement of Karl Fisher titration.

COMPARATIVE EXAMPLES 1B TO 2B

Lithium ion batteries of Comparative Examples 1B to 2B and lithium ion batteries of Examples 1B to 9B and 11B to 12B were almost the same. The differences were that negative electrode of Comparative Example 1A was used in Comparative Example 1B and that negative electrode of Comparative Example 2A was used in Comparative Example 2B.

❰ Sodium Ion Battery ❱

EXAMPLE 10C

Sodium ion battery of Example 10C was almost the same as lithium ion battery of Example 1B. The differences were that negative electrode of Example 10A was used in sodium ion battery of Example 10C and that the electrolyte in Example 10C was 1M sodium hexafluorophosphate ($NaPF_6$) solution. Aforesaid 1M $NaPF_6$ solution was obtained by $NaPF_6$ dissolving in the mixture of EC, EMC and DMC (volume ratio: 1:1:1).

TEST EXAMPLE 5

Cyclic Coltammetry

Lithium ion batteries of Examples 1B to 4B and 7B were used as samples in this test example. The cyclic voltammetry was conducted between 0.003 V and 1.5V (vs. $Li^+/Li$) at scanning rate of 1 mV/s and atmosphere of 1 atm. The results were shown in FIGS. 7A and 7B.

Figure 7A:
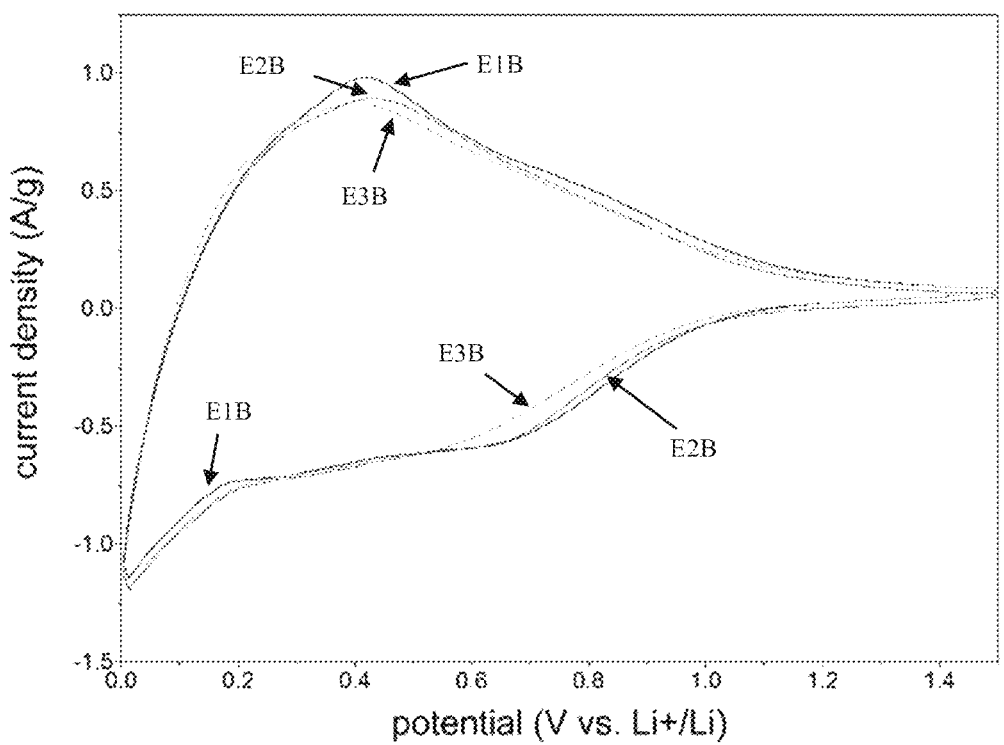
FIG. 7A is a cyclic voltammetry graph of Examples 1B to 3B.
Figure 7B:
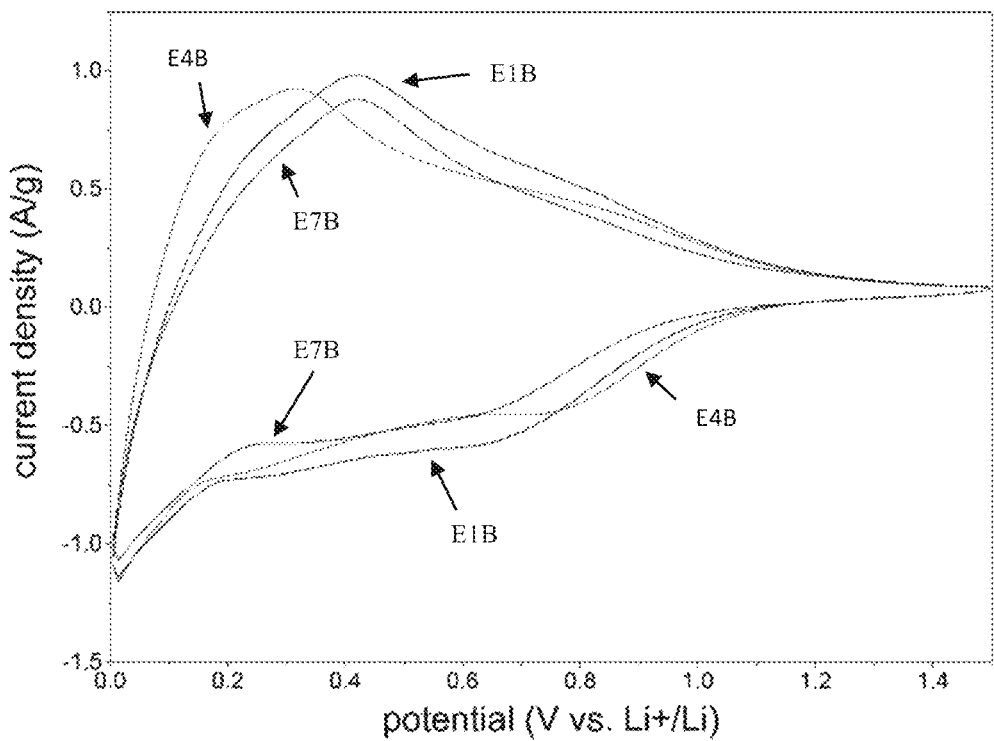
FIG. 7B is a cyclic voltammetry graph of Examples 1B, 4B and 7B.

As shown in FIGS. 7A and 7B, the cyclic voltammetry curves of Examples 1B to 4B and 7B were similar, which indicated that mechanisms of lithium ion storage of aforesaid Examples were similar and lithium ion storage started around 0.8 V. As shown in FIG. 7B, Example 4B has the best efficiency of lithium ion storage.

TEST EXAMPLE 6

Galvanostatic Charge/Discharge Cycle, GCD Cycle)

Lithium ion batteries of Examples 1B to 9B and 11B to 12B and sodium ion battery of Example 10C were used as samples in this test example. GCD cycle was conducted at a current density of 50 mA/g (0.2C), voltage ranging between 0.003 V and 1.5 V (vs. $Li^+/Li$), and atmosphere of 1 atm. The results were shown in FIG. 8A to FIG. 8F. As shown in FIG. 8A to FIG. 8F, the GCD curves comprised plateau region (about 0.003 V to 0.12 V) and sloping area (about 0.12 V to 1.5 V). The specific capacities of plateau region and sloping area were shown in Table 5 respectively.

Figure 8A:
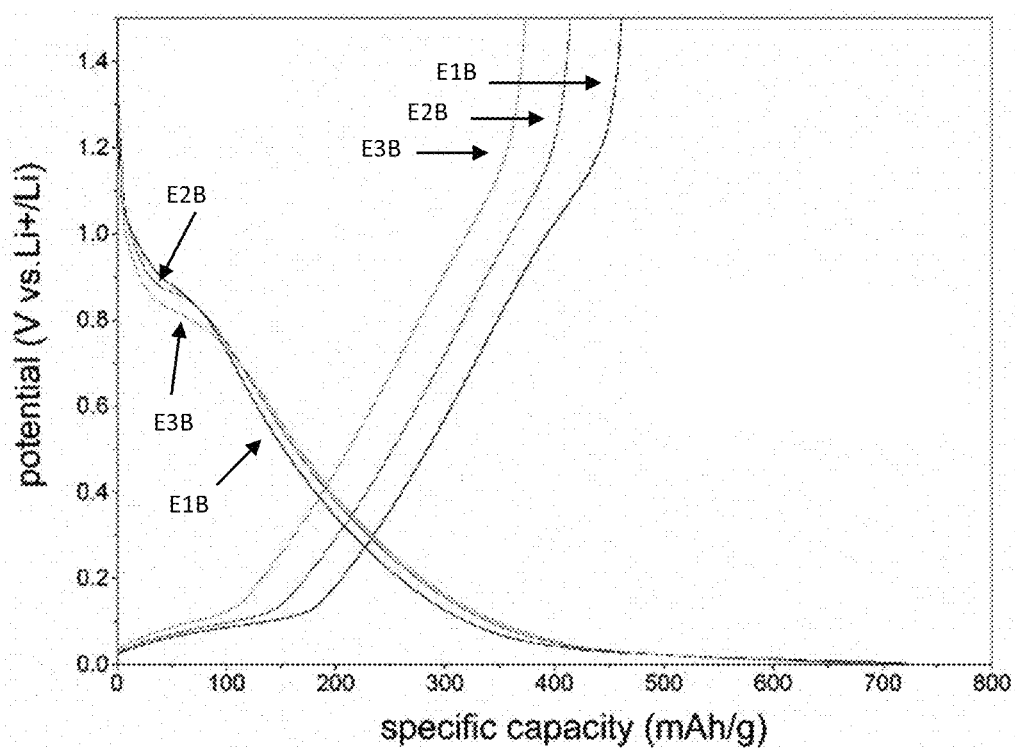
FIG. 8A is a Galvanostatic charge/discharge cycle graph of Examples 1B to 3B.
Figure 8B:
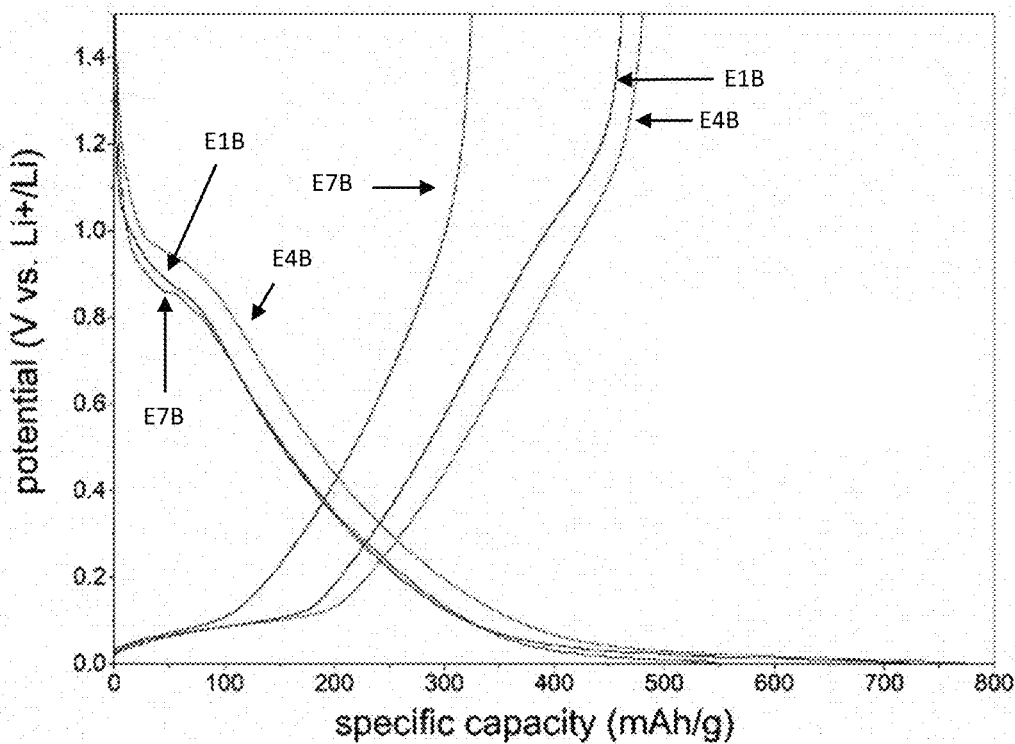
FIG. 8B is a Galvanostatic charge/discharge cycle graph of Examples 1B, 4B and 7B.

FIG. 8A and FIG. 8B were taken as examples. As shown in FIG. 8A, Examples 1B to 3B had the similar slope of sloping area in GCD curves, which indicated that the greater specific capacity of plateau region contributed to higher total specific capacity of lithium ion battery. As shown in FIG. 8B, the slope of sloping area in Examples 1B and 4B was less than the one in Example 7B, which indicated that the specific capacity of sloping area in Examples 1B and 4B was greater than the one in Example 7B. The GCD curve of Example 4B had the most significant plateau region among the three, which indicated that the total specific capacity of Example 4B was the highest among the three.

TABLE 5 specific capacity of plateau region, specific capacity of sloping area, total specific capacity and initial Faraday efficiency (FE) of GCD curves of Examples 1B to 9B and 11B to 12B and Example 10C (current density: 0.2C, unit of specific capacity: mAh/g)

| | Specific capacity of plateau region (mAh/g) | Specific capacity of sloping area (mAh/g) | Total specific capacity (mAh/g) | Initial FE (%) |
|---|---|---|---|---|
| E1B | 171 | 290 | 461 | 64 |
| E2B | 137 | 277 | 414 | 60 |
| E3B | 97 | 276 | 373 | 56 |
| E4B | 200 | 280 | 480 | 65 |
| E5B | 180 | 248 | 428 | 61 |

TABLE 5-continued specific capacity of plateau region, specific capacity of sloping area, total specific capacity and initial Faraday efficiency (FE) of GCD curves of Examples 1B to 9B and 11B to 12B and Example 10C (current density: 0.2C, unit of specific capacity: mAh/g)

| | Specific capacity of plateau region (mAh/g) | Specific capacity of sloping area (mAh/g) | Total specific capacity (mAh/g) | Initial FE (%) |
|---|---|---|---|---|
| E6B | 142 | 223 | 365 | 58 |
| E7B | 109 | 216 | 325 | 60 |
| E8B | 106 | 205 | 311 | 61 |
| E9B | 100 | 197 | 297 | 59 |
| E11B | 110 | 240 | 350 | 45 |
| E12B | 140 | 198 | 338 | 44 |
| E10C | 100 | 130 | 230 | 73 |

As shown in Table 5, cross-linking density of phenol-formaldehyde resin had great influence on formation of closed micropore. Hard carbon bead carbonized by phenol-formaldehyde resin with low cross-linking density had more micro-graphitic structures and/or closed micropores, which was beneficial to lithium ion storage.

As shown in Table 5, cross-linking density of phenol-formaldehyde resin had decisive influence on specific capacity of plateau region. The specific capacity of plateau region of Example 4B was 200 mAh/g, and the total specific capacity of Example 4B was 480 mAh/g.

As shown in Table 5, GCD curves of Examples 1B to 9B and 11B to 12B had significant plateau region and sloping area. The specific capacity of aforesaid plateau region was greater than or equal to 90 mAh/g and less than or equal to 220 mAh/g, the specific capacity of aforesaid sloping area was greater than or equal to 180 mAh/g and less than or equal to 320 mAh/g, and the total specific capacity was greater than or equal to 280 mAh/g and less than or equal to 500 mAh/g.

Figure 8C:
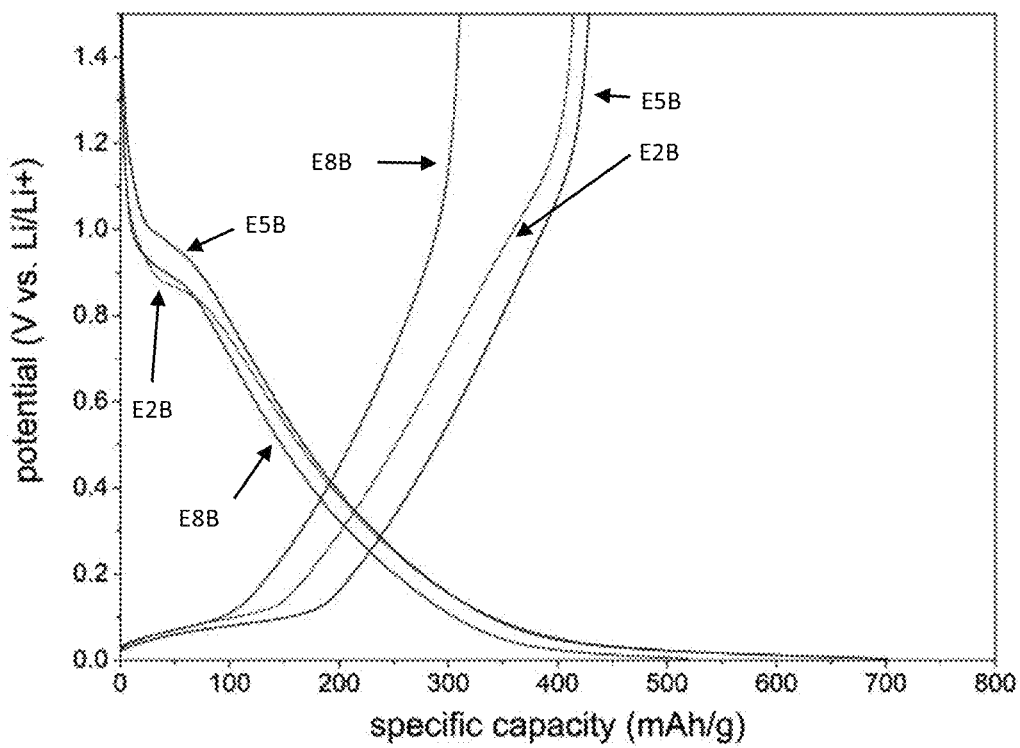
FIG. 8C is a Galvanostatic charge/discharge cycle graph of Examples 2B, 5B and 8B.
Figure 8D:
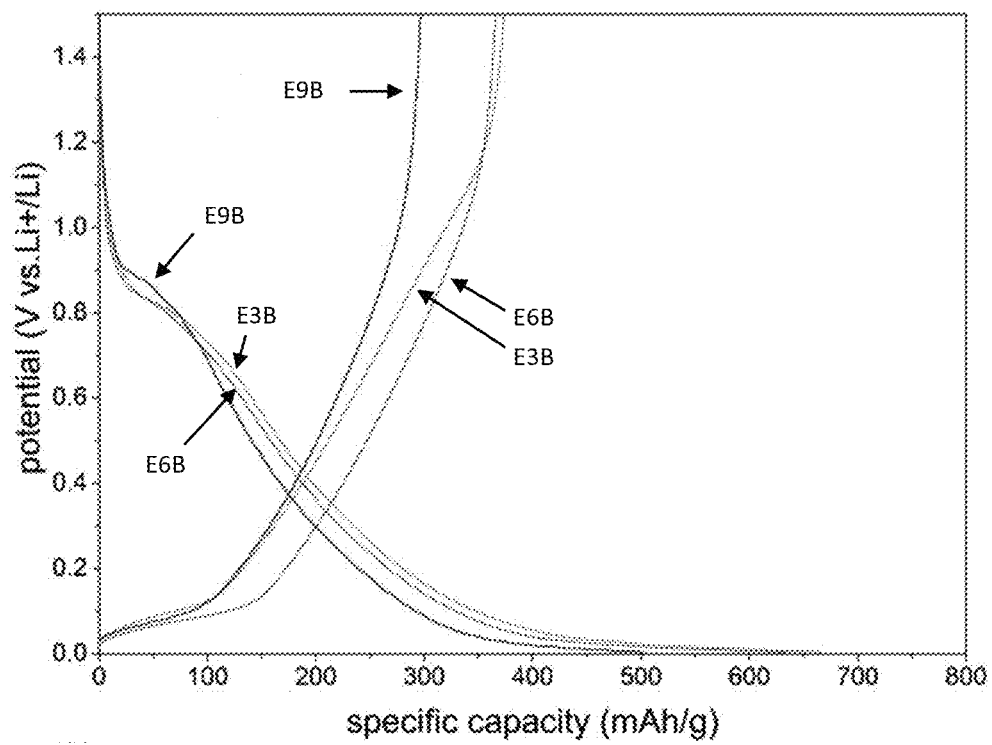
FIG. 8D is a Galvanostatic charge/discharge cycle graph of Examples 3B, 6B and 9B.
Figure 8E:
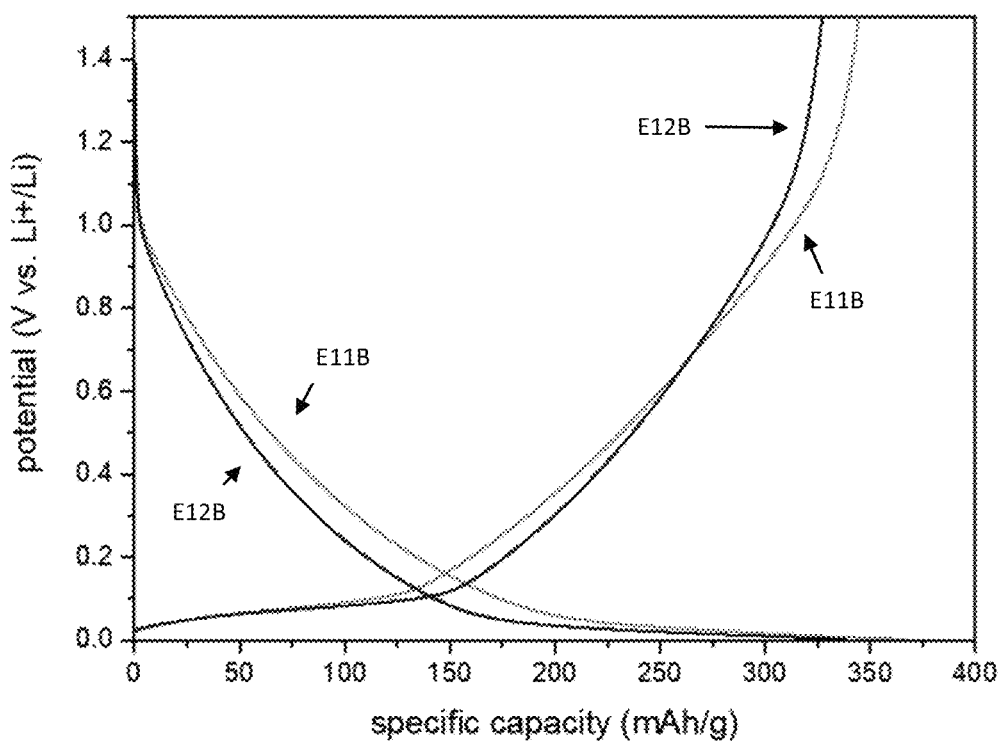
FIG. 8E is a Galvanostatic charge/discharge cycle graph of Examples 11B and 12B.
Figure 8F:
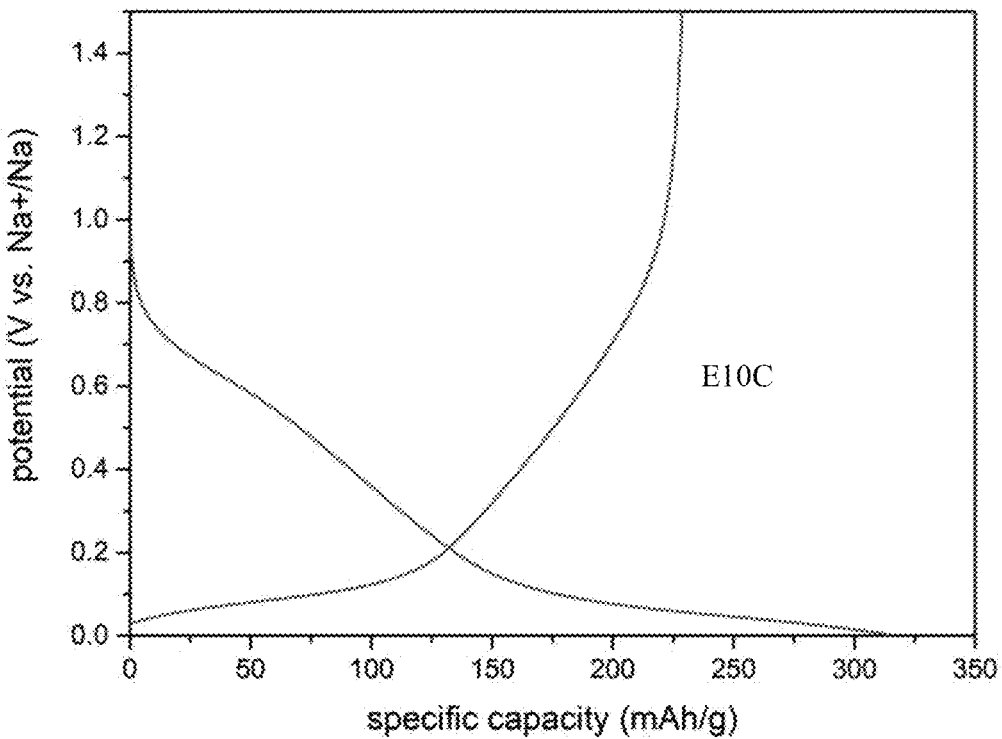
FIG. 8F is a Galvanostatic charge/discharge cycle graph of Examples 10C.

As shown in FIG. 8F, the hard carbon bead of the instant disclosure served as negative electrode could apply to the sodium ion battery. The GCD curve of aforesaid sodium ion battery had significant plateau region, which indicated the hard carbon bead of the instant disclosure had the ability to store sodium ion. The sodium ion battery of Example 10C had total specific capacity of 230 mAh/g.

In one of the embodiments, the initial Faraday efficiency of lithium ion batteries of Examples 1B to 9B and 11B to 12B may be raised by pre-lithiation of negative electrode.

TEST EXAMPLE 7

Rate Capability

Figure 9A:
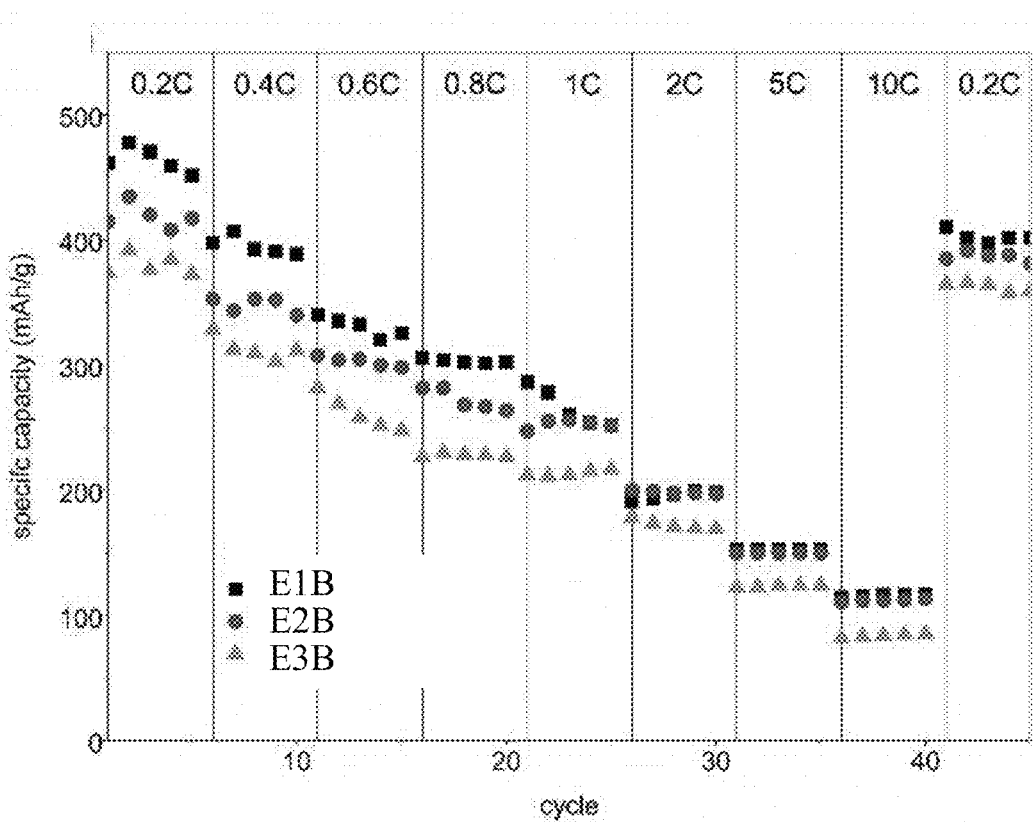
FIG. 9A is a rate capability graph of Examples 1B to 3B.
Figure 9B:
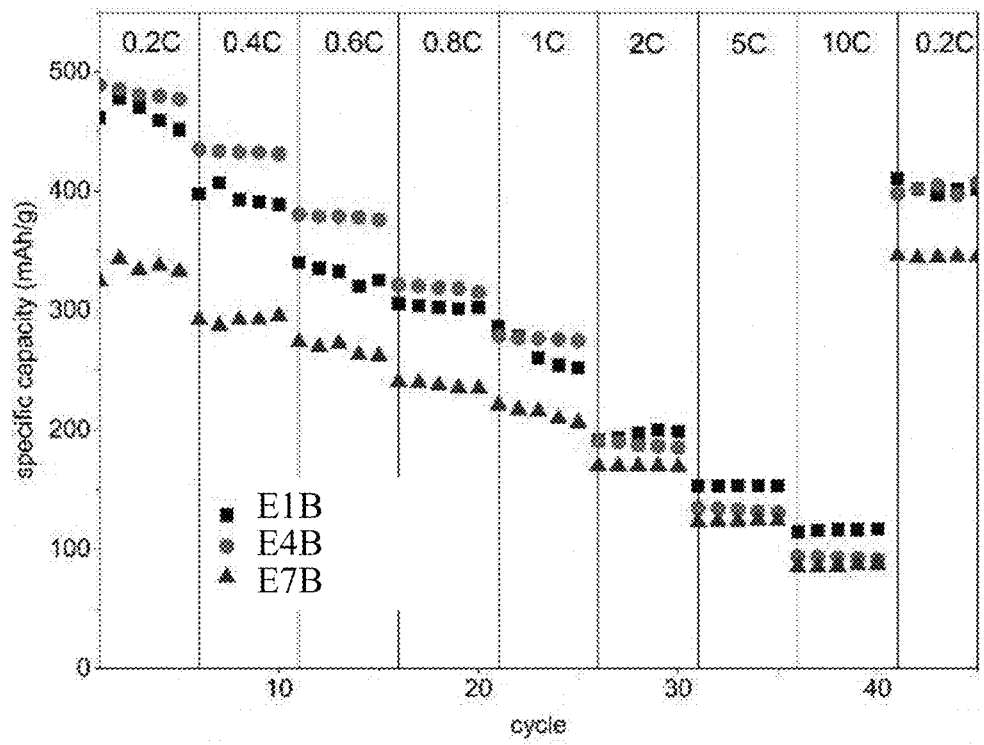
FIG. 9B is a rate capability graph of Examples 1B, 4B and 7B.
Figure 9C:
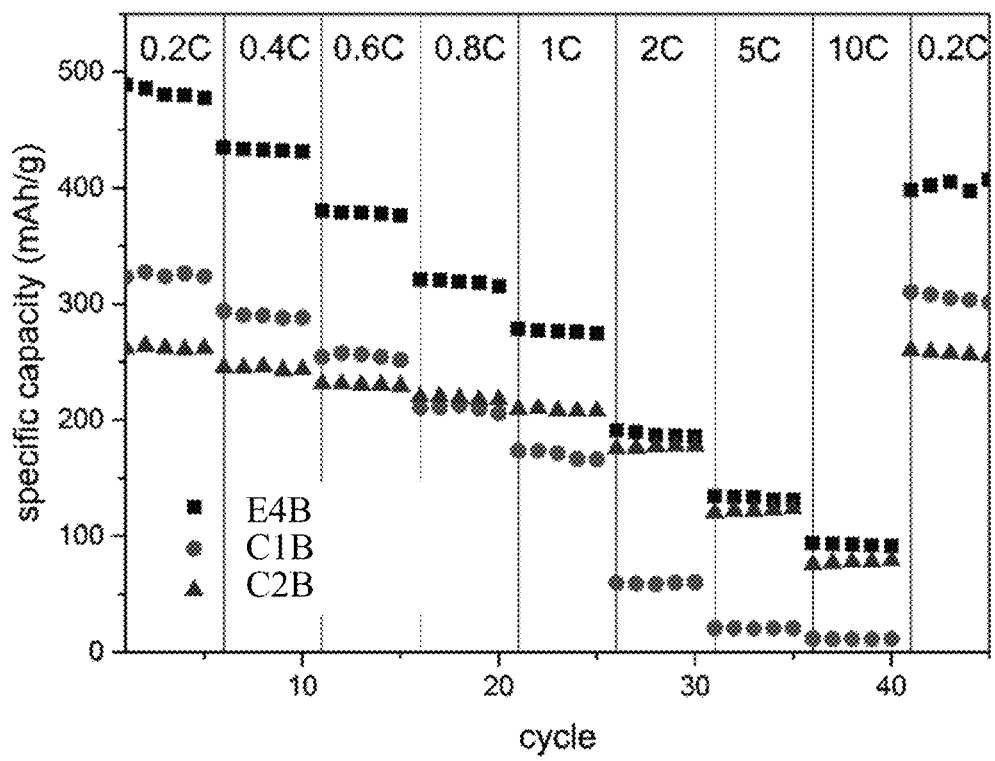
FIG. 9C is a rate capability graph of Example 4B and Comparative Examples 1B and 2B.

Lithium ion batteries of Examples 1B to 4B and 7B and Comparative Examples 1B to 2B were used as samples in this test example. The test was conducted at current density ranging from 50 mA/g to 2500 mA/g (0.2C to 10C) and atmosphere of 1 atm. The results were shown in FIG. 9A to FIG. 9C. As shown in FIG. 9A to FIG. 9B, Examples 1B to 4B and 7B had good rate capability at current density ranging from 2C to 10C.

As shown in FIG. 8C, at current density of 0.2C, the total specific capacity of Example 4B was greater than the total specific capacity of Comparative Example 1B and the total specific capacity of Comparative Example 2B. At current density of 10C, the total specific capacity of Comparative Example 1B was close to 0 mAh/g, but the total specific capacity of Example 4B was still about 100 mAh/g, which indicated that Example 4B had abilities of lithium ion storage and lithium ion transmittance at high speed charge-discharge process.

TEST EXAMPLE 8

Capacity Retention

Lithium ion battery of Example 4B was used as sample in this test example. Initial 3 charge-discharge cycles were measured at current density of 50 mA/g (0.2C) and atmosphere of 1 atm and subsequent 50 charge-discharge cycles were measured at current density of 250 mA/g (1C) and atmosphere of 1 atm. The result was shown as FIG. 10.

Figure 10:
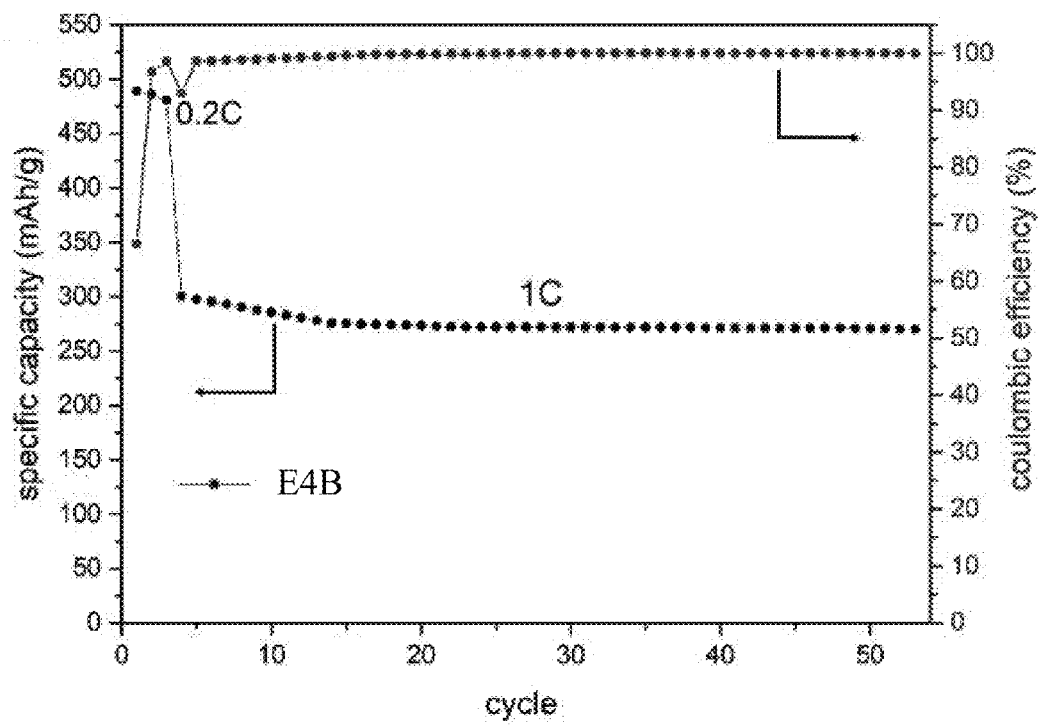
FIG. 10 is a capacity retention graph of Example 4B.

As shown in FIG. 10, as current density increased from 0.2C to 1C, the total specific capacity of Example 4B was decreased from 480 mAh/g to 300 mAh/g. Although subsequent capacity retention test was carried out at current density of 1C, the total specific capacity of Example 4B still had 90% initial total specific capacity after 50 charge-discharge cycles.

In summary, the method of preparing hard carbon beads involves a cross-linking reaction of phenol-formaldehyde resin heated by microwave. The method can reduce energy consumption, control the curing extent, and solve the problems of side reaction and high energy-consumption occurring at high temperature cross-linking reaction. Therefore, economic values of the negative electrode, lithium ion battery, sodium ion battery, lithium ion capacitor, and sodium ion capacitor comprising the hard carbon beads can be increased.

What is claimed is:

1. A method of preparing hard carbon beads comprising:
   step (a): dissolving phenol-formaldehyde resin, a cross-linking reagent and a protection reagent into a solvent to form a mixture and heating the mixture by microwave for cross-linking reaction to obtain a suspension containing phenol-formaldehyde beads, wherein the phenol-formaldehyde resin is set to be 100 parts by weight, the cross-linking reagent is greater than or equal to 5 parts by weight and less than or equal to 70 parts by weight, the protection reagent is greater than or equal to 1 part by weight and less than or equal to 10 parts by weight, a heating temperature of microwave is greater than or equal to 100° C. and less than or equal to 180° C., the cross-linking reagent is selected from the group consisting of: hexamethylenetetramine, formaldehyde acetal, furfural, furfural alcohol and trimethylol phosphine oxide, and the protection reagent is selected from the group consisting of: polyvinyl alcohol, methyl cellulose and polyoxyethylene polyoxypropylene;
   step (b): drying the suspension containing phenol-formaldehyde beads to obtain phenol-formaldehyde beads; and
   step (c): subjecting the phenol-formaldehyde beads for carbonization under inert gas to obtain the hard carbon beads,
   wherein a carbonization temperature is greater than or equal to 500° C. and less than or equal to 1500° C.; and the hard carbon beads have a maximum particle size and a minimum particle size, and a ratio of the maximum particle size to the minimum particle size is greater than or equal to 1.021 and less than or equal to 1.098.

2. The method as claimed in claim 1, wherein the phenol-formaldehyde resin is set to be 100 parts by weight in step (a), and the cross-linking reagent is greater than or equal to 5 parts by weight and less than or equal to 50 parts by weight.

3. The method as claimed in claim 1, wherein the phenol-formaldehyde resin is set to be 100 parts by weight in step (a), and the cross-linking reagent is greater than or equal to 5 parts by weight and less than or equal to 30 parts by weight.

4. The method as claimed in claim 1, wherein the carbonization temperature in step (c) is greater than or equal to 600° C. and less than or equal to 1500° C.

5. The method as claimed in claim 1, wherein the carbonization temperature in step (c) is greater than or equal to 700° C. and less than or equal to 1200° C.

6. The method as claimed in claim 1, wherein the phenol-formaldehyde resin has a number average molecular weight greater than or equal to 200 and less than or equal to 10000.

7. The method as claimed in claim 1, wherein the phenol-formaldehyde resin is nitrogen-doped phenol-formaldehyde resin or phenol-formaldehyde resin without nitrogen doping.

8. The method as claimed in claim 1, wherein the solvent comprises 0 vol % to 100 vol % water and 0 vol % to 100 vol % alcohol, and the alcohol is methanol, ethanol or the combination thereof.

9. The method as claimed in claim 1, wherein the phenol-formaldehyde resin has a number average molecular weight greater than or equal to 200 and less than or equal to 3000 and the solvent is water, methanol or ethanol.

10. The method as claimed in claim 1, wherein the phenol-formaldehyde resin has a number average molecular weight greater than or equal to 2000 and less than or equal to 4000 and the solvent comprises 20 vol % to 80 vol % water and 20 vol % to 80 vol % methanol or ethanol.

11. A hard carbon bead having a maximum particle size and a minimum particle size, wherein a ratio of the maximum particle size to the minimum particle size is greater than or equal to 1.021 and less than or equal to 1.098.

12. The hard carbon bead as claimed in claim 11, wherein the hard carbon bead has an average group particle size greater than or equal to 3.5 µm and less than or equal to 4.8 µm.

13. The hard carbon bead as claimed in claim 11, wherein the hard carbon bead has an average group particle size greater than or equal to 3.8 µm and less than or equal to 4.6 µm.

14. The hard carbon bead as claimed in claim 12, wherein the hard carbon bead has a standard deviation of particle size greater than or equal to 1.2 µm and less than or equal to 2.8 µm.

15. The hard carbon bead as claimed in claim 11, wherein the hard carbon bead has a graphitic length $L_a$ micro structure greater than or equal to 2.9 nm and less than or equal to 3.5 nm.

16. The hard carbon bead as claimed in claim 11, wherein the hard carbon bead has a graphitic length $L_a$ micro structure greater than or equal to 3.0 nm and less than or equal to 3.4 nm.

17. The hard carbon bead as claimed in claim 11, wherein the Raman spectrum of the hard carbon bead has D1 band and G band, and the ratio of the intensity of D1 band to the intensity of G band is greater than or equal to 2.0 and less than or equal to 2.5.

18. An energy storage device comprising a negative electrode and a lithium foil as a counter electrode, wherein the negative electrode comprises the hard carbon beads as claimed in claim 11, the negative electrode coupling with the counter electrode of lithium foil has a Galvanostatic charge-discharge curve, and the Galvanostatic charge-discharge curve comprises a plateau region ranging from 0.003 V to 0.12 V and a sloping area ranging from 0.12 V to 1.5 V, a specific capacity of the plateau region is greater than or equal to 90 mAh/g and less than or equal to 220 mAh/g, and a specific capacity of the sloping area is greater than or equal to 120 mAh/g and less than or equal to 320 mAh/g.

19. The energy storage device as claimed in claim 18, wherein the energy storage device has a total specific capacity greater than or equal to 280 mAh/g and less than or equal to 500 mAh/g.

* * * * *